(12) United States Patent
Matsuhira

(10) Patent No.: US 7,869,630 B2
(45) Date of Patent: Jan. 11, 2011

(54) APPARATUS AND METHOD FOR PROCESSING IMAGE

(75) Inventor: Masatoshi Matsuhira, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1153 days.

(21) Appl. No.: 11/391,203

(22) Filed: Mar. 29, 2006

(65) Prior Publication Data

US 2006/0257039 A1 Nov. 16, 2006

(30) Foreign Application Priority Data

Mar. 29, 2005 (JP) .............................. 2005-094814
Mar. 29, 2005 (JP) .............................. 2005-094815

(51) Int. Cl.
G06K 9/62 (2006.01)
(52) U.S. Cl. ..................... 382/118; 382/167; 382/216; 382/217; 358/1.9; 358/3.26
(58) Field of Classification Search ................. 382/118, 382/209, 217, 218, 274, 275, 167, 216; 358/1.9, 358/3.26, 3.27
See application file for complete search history.

(56) References Cited

U.S. PATENT DOCUMENTS

| | | | | |
|---|---|---|---|---|
| 6,975,759 B2 * | 12/2005 | Lin | ............................. | 382/167 |
| 7,050,607 B2 * | 5/2006 | Li et al. | ...................... | 382/118 |
| 7,106,887 B2 * | 9/2006 | Kinjo | ......................... | 382/118 |
| 7,221,476 B2 | 5/2007 | Nishi et al. | | |
| 7,502,493 B2 | 3/2009 | Ishida | | |
| 7,756,302 B2 * | 7/2010 | Matsuzaka et al. | .......... | 382/118 |
| 2001/0019620 A1 * | 9/2001 | Nagai et al. | ................. | 382/104 |
| 2004/0131278 A1 * | 7/2004 | Imagawa et al. | ............ | 382/284 |
| 2004/0228528 A1 | 11/2004 | Lao | | |
| 2005/0100195 A1 * | 5/2005 | Li | .............................. | 382/118 |
| 2009/0123037 A1 | 5/2009 | Ishida | | |

FOREIGN PATENT DOCUMENTS

| | | | |
|---|---|---|---|
| JP | 2000-165647 A | | 6/2000 |
| JP | 2002369020 A | | 12/2002 |
| JP | 2002-099777 A | | 4/2003 |
| JP | 2004-062565 A | | 2/2004 |
| JP | 2004133637 A | * | 4/2004 |
| JP | 2004-246458 A | | 9/2004 |
| JP | 2005-079940 A | | 3/2005 |

OTHER PUBLICATIONS

English translation of JP 2004133637 A to Morisada.*

* cited by examiner

*Primary Examiner*—Jon Chang
(74) *Attorney, Agent, or Firm*—Sughrue Mion, PLLC

(57) ABSTRACT

A template representative of an image of a human face is provided. At least one of the template and image data is rotated to adjust a relative angle between an original orientation of the template and an original orientation of the image data, so as to exclude an angle range including 180 degrees. It is examined a matching between a part of the image data and the template to identify a region in the image data containing an image of a human face. The image data is corrected in accordance with a condition of the image of the human face.

8 Claims, 17 Drawing Sheets

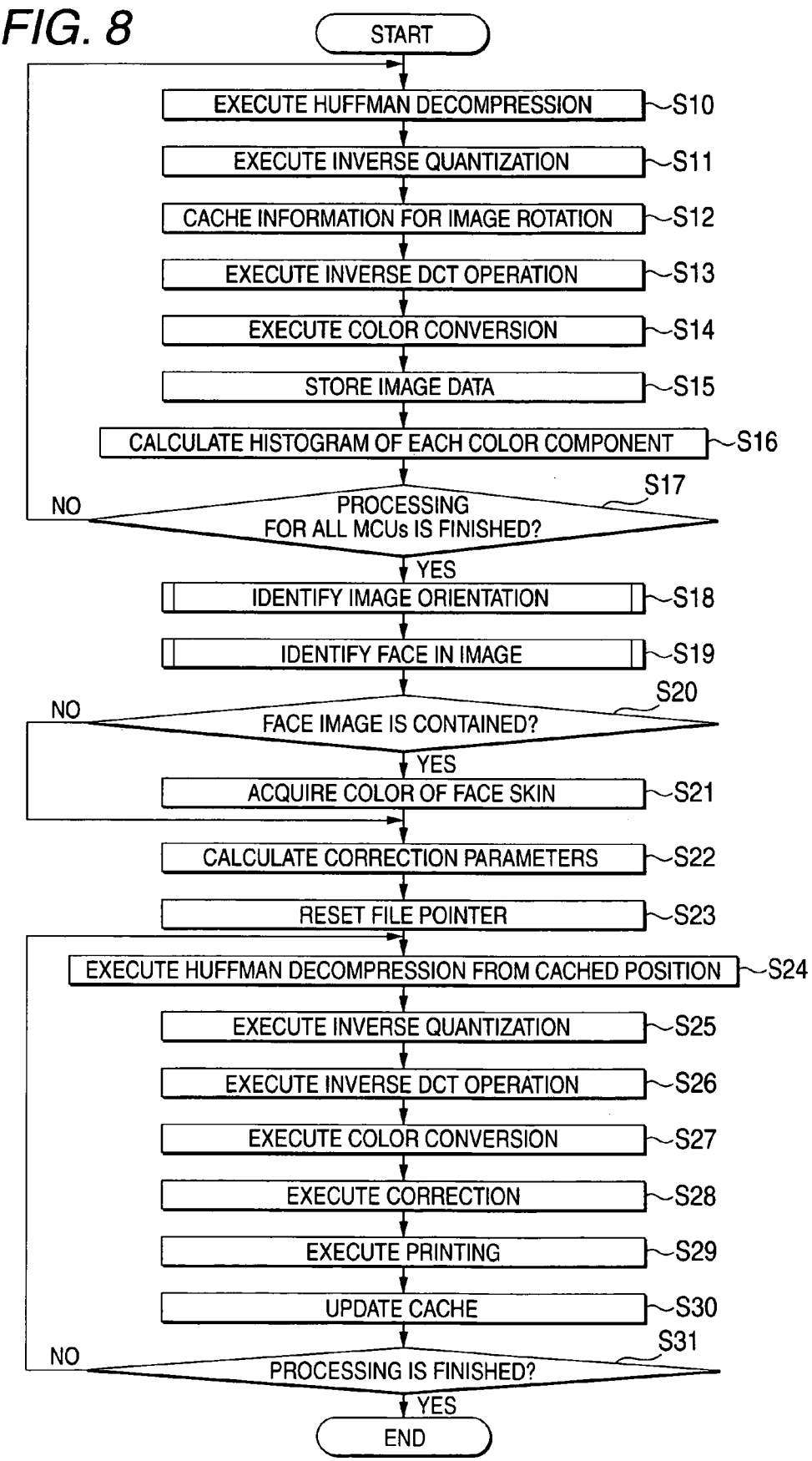

| TYPE OF SKIN COLOR | TYPE OF LIGHT SOURCE | R | G | B |
|---|---|---|---|---|
| 1st SKIN COLOR | SUNLIGHT | 235~245 | 225~235 | 230~240 |
| | FLUORESCENT LAMP | 233~243 | 225~235 | 232~242 |
| | INCANDESCENT LAMP | 237~247 | 225~235 | 228~238 |
| 2nd SKIN COLOR | SUNLIGHT | 229~249 | 205~215 | 168~178 |
| | FLUORESCENT LAMP | 227~247 | 205~215 | 170~180 |
| | INCANDESCENT LAMP | 231~251 | 205~215 | 166~176 |
| 3rd SKIN COLOR | SUNLIGHT | 86~96 | 46~56 | 37~47 |
| | FLUORESCENT LAMP | 84~94 | 46~56 | 39~49 |
| | INCANDESCENT LAMP | 88~98 | 46~56 | 35~45 |

APPARATUS AND METHOD FOR PROCESSING IMAGE

BACKGROUND OF INVENTION

The present invention relates to an apparatus and a method for processing an image.

In recent years, printing apparatuses have been spreading that can easily print images captured by a digital camera or the like. Recently, with the spread of digital cameras, printing apparatuses including a slot into which a memory card can be inserted or alternatively high resolution printing apparatuses including an interface for connection to a digital camera are commercially available. In such printing apparatuses, their print engines are of an ink jet type or sublimation type, and achieve high resolution printing.

Meanwhile, in the images captured by a digital camera, for example, the exposure value can be inappropriate or alternatively color fogging occurs owing to the camera's own characteristics or the like. Thus, techniques for correcting these are disclosed in, for example, Japanese Patent Publication No 2000-165647A.

Meanwhile, the correction described above is preferred to be performed in accordance with the kind of a captured object (e.g., scenery and person). Nevertheless, the technique disclosed in the above publication has a problem that correction in accordance with the captured object cannot be performed.

Further, in recent years, so-called stand-alone printers have been commercially available, to which no personal computer is connected and in which the printing apparatus itself is composed of an image data reader and an image processor, so that the printing apparatus can perform image printing independently. In such stand-alone printers, the processing speed of the central processing unit is slower than in personal computers. This causes a problem that a long time is necessary before the start of printing when complicated correction processing is performed in accordance with the captured object.

SUMMARY OF THE INVENTION

It is therefore an object of the present invention to provide an apparatus and a method capable of performing optimal correction in accordance with the captured object in a short time.

In order to achieve the above object, according to the invention, there is provided a method of processing image data, comprising:

providing a template representative of an image of a human face;

rotating at least one of the template and the image data to adjust a relative angle between an original orientation of the template and an original orientation of the image data, so as to exclude an angle range including 180 degrees;

examining a matching between a part of the image data and the template to identify a region in the image data containing an image of a human face; and correcting the image data in accordance with a condition of the image of the human face.

The relative angle may fall within a range from −135 degrees to +135 degrees.

The method may further comprise:

detecting angle information contained in the image data and indicative of an orientation of an image capturing device when an image in the image data is captured; and determining the relative angle based on the angle information.

The relative angle may be determined in accordance with a positional relationship between a skin color region and black color region which are contained in the image data.

According to the invention, there is also provided a program product comprising a program operable to cause a computer to execute the above method.

According to the invention, there is also provided an image processor, adapted to process image data, comprising:

a storage, storing a template representative of an image of a human face;

a rotator, operable to at least one of the template and the image data to adjust a relative angle between an original orientation of the template and an original orientation of the image data, so as to exclude an angle range including 180 degrees;

a matching executer, operable to examine a matching between a part of the image data and the template to identify a region in the image data containing an image of a human face; and a corrector, operable to correct the image data in accordance with a condition of the image of the human face.

According to the invention, there is also provided a printing apparatus comprising:

the above image processor; and a printing head, operable to print the corrected image data on a printing medium.

According to the invention, there is also provided a method of processing image data, comprising:

extracting a partial region from the image data;

providing a template representative of an image of a human face;

examining a matching between the partial region and the template to determine whether the partial region contains an image of a human face; and correcting the image data in accordance with a condition of the image of the human face.

The partial region may be located in a central region of the image data.

The method may further comprise enlarging the partial region.

The method may further comprise reducing a data size of the partial region.

According to the invention, there is also provided a program product comprising a program operable to cause a computer to execute the above method.

According to the invention, there is also provided an image processor, adapted to process image data, comprising:

an extractor, operable to extract a partial region from the image data;

a storage, storing a template representative of an image of a human face;

a matching executer, operable to examine a matching between the partial region and the template to determine whether the partial region contains an image of a human face; and a corrector, operable to correct the image data in accordance with a condition of the image of the human face.

According to the invention, there is also provided a printing apparatus comprising:

the above image processor; and a printing head, operable to print the corrected image data on a printing medium.

BRIEF DESCRIPTION OF THE DRAWINGS

The above objects and advantages of the present invention will become more apparent by describing in detail preferred exemplary embodiments thereof with reference to the accompanying drawings, wherein:

FIGS. 6A through 7A show a relationship of an attitude of the digital camera and a direction of a captured image;

FIG. 8 is a flowchart showing processing performed in the printing apparatus of FIG. 1;

DETAILED DESCRIPTION OF THE EMBODIMENTS

Embodiments of the invention will be described below in detail with reference to the accompanying drawings.

Figure 1:
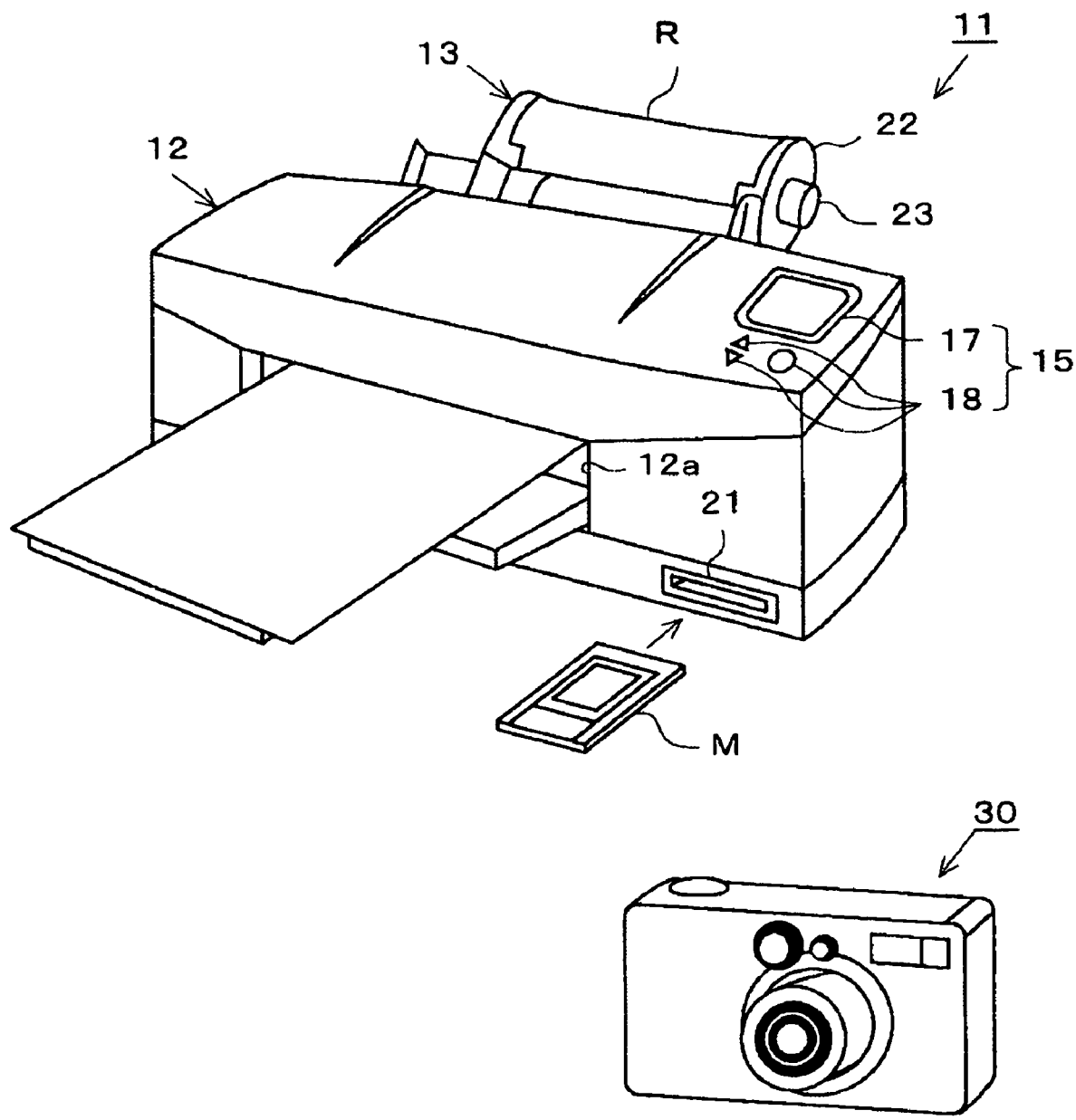
FIG. 1 is a perspective view of a printing apparatus according to a first embodiment of the invention.

As shown in FIG. 1, an ink jet type printing apparatus 11 according to a first embodiment of the invention comprises: a casing 12; a sheet feeding unit 13 for feeding rolled sheet R and a cut sheet (not shown); and a printing section for performing printing onto the rolled sheet R or the cut sheet.

The box-shaped casing 12 has a control panel 15 at a right side of the upper face. The control panel 15 is equipped with: an LCD (Liquid Crystal Display) 17; and input buttons 18. The LCD 17 displays the menu function, the contents of operation, the status of operation, the contents of error, and the like of the printing apparatus 11. The input button 18 is pushed when menu selection or the like is performed in the printing apparatus 11. Further, using the LCD 17 and the input buttons 18 described here, various kinds of operations can be performed like cutting position adjustment.

The casing 12 has an ejection port 12a at a lower part of the front face so that rolled sheet R or a cut sheet having undergone printing is ejected through this port. Further, a card slot 21 is provided at a front right side of the casing 12, while, for example, a memory card M for recording image data captured by a digital camera 30 or the like is accommodated in this slot in a freely removable manner.

The sheet feeding unit 13 is provided at the rear face side of the casing 12, and has a holder 22 fixed to the casing 12 and a rotary shaft 23. Then, the termination end of the rolled sheet R is connected to and wound around the rotary shaft 23. In this state, the rotary shaft 23 is rotatably supported on the holder 22. Then, when a user pinches both ends of the rotary shaft 23 and then rotates the rotary shaft 23 in a normal or reverse direction, the rolled sheet R is fed forward from or rolled up to the sheet feeding unit 13.

Figure 2:
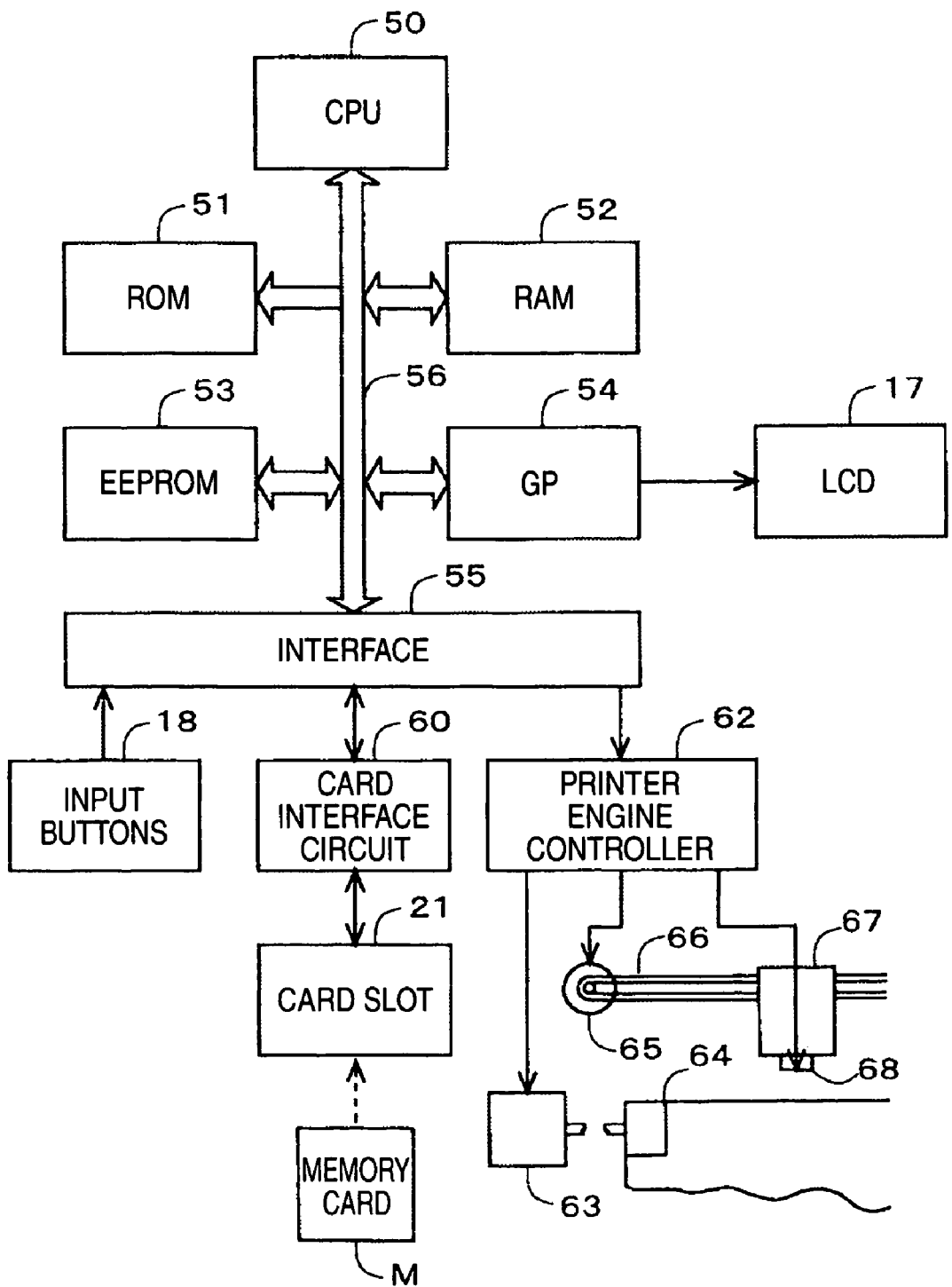
FIG. 2 is a block diagram showing a control system of the printing apparatus of FIG. 1.

As shown in FIG. 2, a control system of the printing apparatus includes a CPU (Central Processing Unit) 50, a ROM (Read Only Memory) 51, a RAM (Random Access Memory) 52, an EEPROM (Electrically Erasable and Programmable ROM) 53, a GP (Graphic Processor) 54, an interface 55, a bus 56, the LCD 17, the input buttons 18, the card slot 21, a card interface circuit 60, a printer engine controller 62, a sheet feeding motor 63; a sheet feeding roller 64, a carriage motor 65, a driving belt 66, a carriage 67, a printing head 68, and a RAM 69.

Here, the CPU 50 executes various kinds of arithmetic processing according to programs stored in the ROM 51 and the EEPROM 53 and, at the same time, controls various sections of the apparatus including the sheet feeding motor 63 and the carriage motor 65.

The ROM 51 is a semiconductor memory for storing various kinds of programs executed by the CPU 50 and various kinds of data. The RAM 52 is a semiconductor memory for temporarily storing programs and data to be executed by the CPU 50.

The EEPROM 53 is a semiconductor memory for storing predetermined data such as arithmetic processing results of the CPU 50 and thereby holding the data even after the printing apparatus is deactivated.

The GP 54 executes display processing on the basis of a display command provided from the CPU 50, and then provides and displays the obtained image data on the LCD 17.

The interface 55 is a unit for appropriately converting the form of representation of the data when information is transferred between the input buttons 18, the card interface circuit 60, and the printer engine controller 62.

The bus 56 is signal lines for interconnecting the CPU 50, the ROM 51, the RAM 52, the EEPROM 53, the GP 54, and the interface 55, and thereby realizing the transfer of information between these units.

As described above, the input button 18 is operated when menu selection or the like is performed. As described above, the memory card M is a non-volatile memory for storing image data captured by a digital camera 30.

As described above, the card slot 21 is provided at a front right side of the casing 12 of the printing apparatus 11, while the memory card M is inserted into this portion. The card interface circuit 60 is an interface for writing or reading information to or from the memory card M.

The printer engine controller 62 is a control unit for controlling the sheet feeding motor 63, the carriage motor 65, and the printing head 68. The sheet feeding motor 63 rotates the sheet feeding roller 64 and thereby moves the cut sheet or the rolled sheet R (referred collectively as a printing sheet) in the secondary scanning direction. The sheet feeding roller 64 is composed of a cylindrical member, and moves the cut sheet or the rolled sheet R in the secondary scanning direction.

The carriage motor 65 provides a driving force to the driving belt 66 one end of which is fixed to the carriage 67, and thereby realizes reciprocating motion of the carriage 67 in the primary scanning direction. The printing head 68 is provided with a plurality of nozzles formed in a face opposing the printing sheet, and thereby ejects ink from a plurality of the nozzles so as to record information onto the printing sheet.

Figure 3:
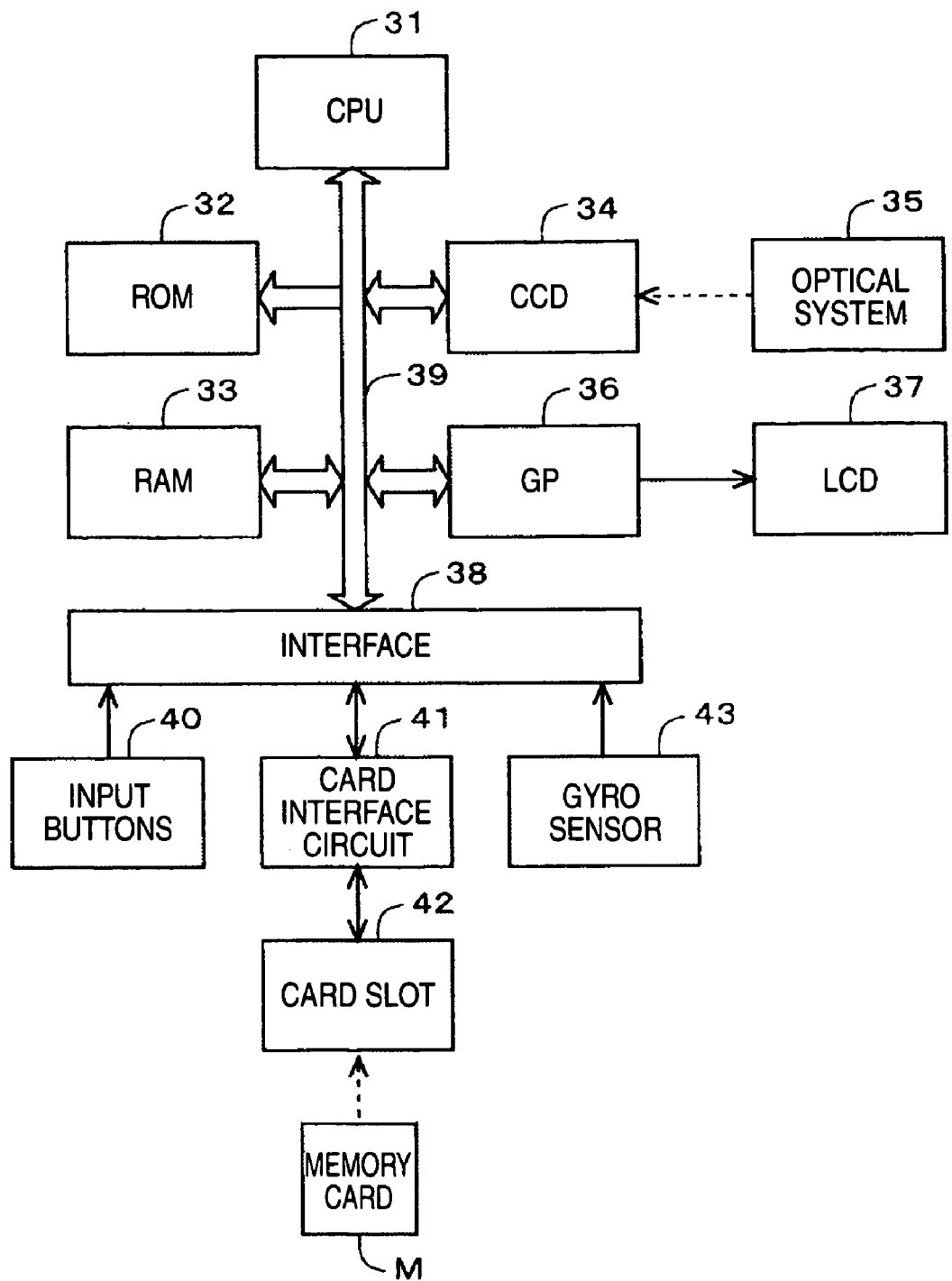
FIG. 3 is a block diagram showing a control system of a digital camera shown in FIG. 1.

As shown in FIG. 3, the digital camera 30 includes a CPU 31, a ROM 32, a RAM 33, a CCD (Charge Coupled Device) 34, an optical system 35, a GP 36, an LCD 37, an interface 38, a bus 39, operation buttons 40, a card interface 41, a card slot 42, a memory card M, and a gyro sensor 43. Here, explanations for components similar to those shown in FIG. 2 will be omitted.

The CCD 34 converts an optical image of an object captured through the optical system 35, into a corresponding electric signal and then outputs the signal. The optical system 35 is composed of a plurality of lenses and an actuator. Then, a plurality of the lenses focus the optical image of the captured object onto a light receiving surface of the CCD 34, while the actuator adjusts the focusing and the like. The gyro sensor 43 generates and outputs a signal indicating the angle (angle relative to the horizontal plane) of the camera body at the time that the object is captured by the digital camera 30. In the digital camera 30, information indicating the angle of the camera at the time of image capturing can be appended to the image data, in the form of exif (Exchangeable Image File Format) information described later.

In this embodiment, when a person's face is contained in image data to be printed by the printing apparatus 11, the image data is corrected in accordance with the state of the pixels constituting the face so that an optimal printing state may be acquired.

Figure 4A:
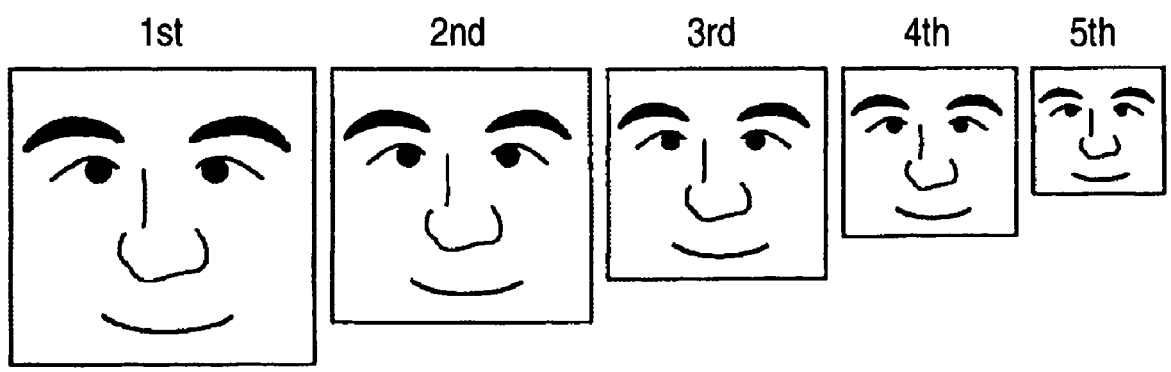
FIG. 4A shows face templates used in matching processing is performed in the printing apparatus of FIG. 1.

Meanwhile, an example of a method of determining whether a face is contained in image data is to perform matching processing on the image data using a template of a face. In this method, since the size and the orientation of an image contained in the image data are not fixed, templates (the first through the fifth templates) of a plurality of sizes are prepared as shown in FIG. 4A. Then, as shown in FIGS. 5A and 5B, matching processing with each template is performed, for example, from the upper left corner of the image data to the lower right corner, so that it is determined whether a face corresponding to a template is contained. In the matching processing, as shown in FIG. 4B, mosaic processing is performed on the template so that influence of the features of an individual person is eliminated.

Figure 6A:
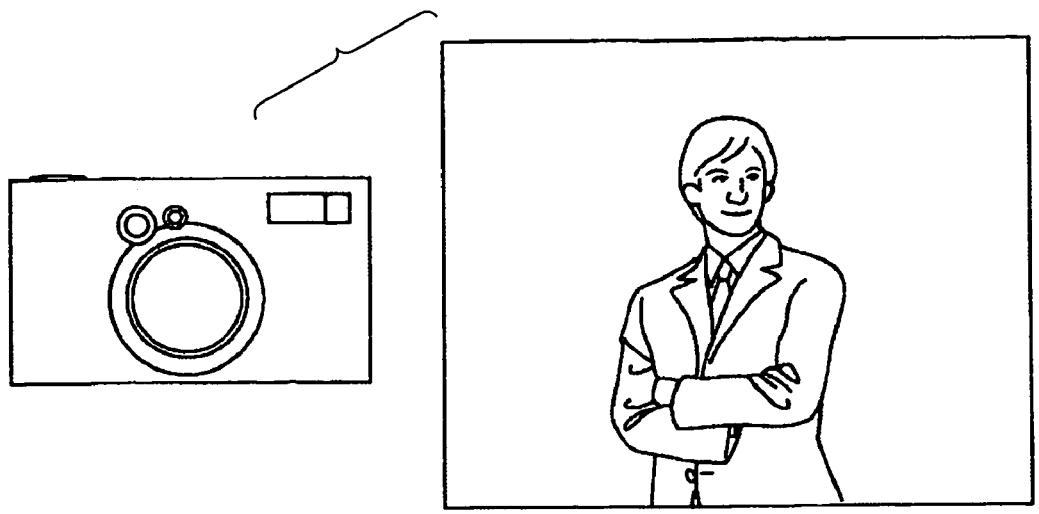
Figure 6B:
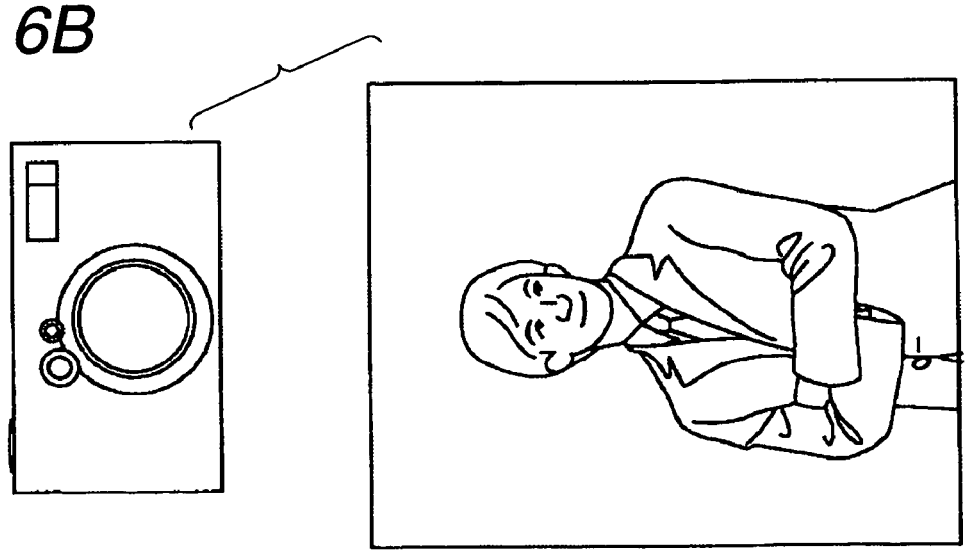
Figure 6C:
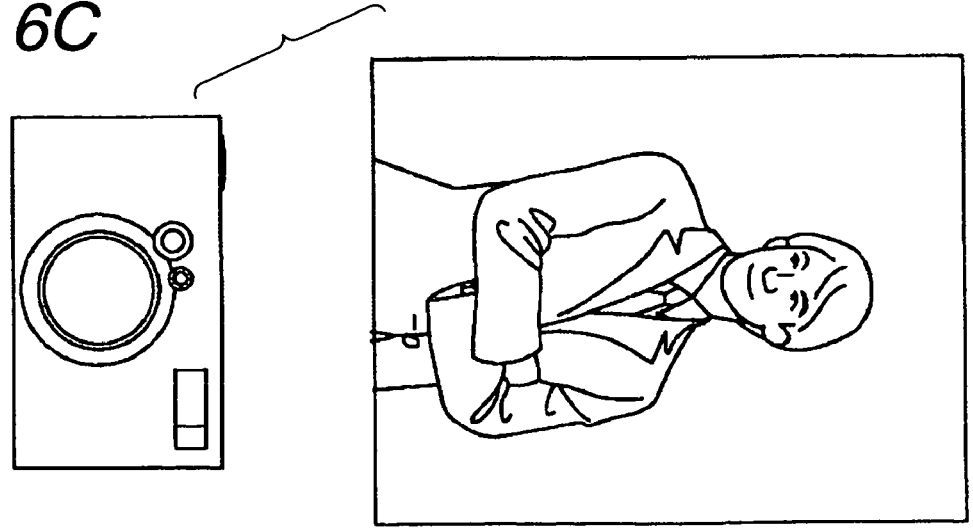

Meanwhile, when a person is captured by the digital camera 30, the attitude of the digital camera 30 can be changed at the time of image capturing as shown in FIGS. 6A to 6C. FIG. 6A shows an ordinary case, while FIG. 6B shows a case that the camera is rotated counterclockwise by 90 degrees viewed from the front. FIG. 6C shows a case that the camera is rotated clockwise by 90 degrees viewed from the front. In these cases, the face contained in the image is in an upright state in FIG. 6A, in a state rotated counterclockwise by 90 degrees in FIG. 6B, and in a state rotated clockwise by 90 degrees in FIG. 6C. Thus, in these cases, when detection processing for a face is executed using the template of upright orientation as shown in FIGS. 4A and 4B, the face in the state of FIGS. 6B and 6C cannot be detected.

Thus, the image data is rotated stepwise throughout 360 degrees. Then, at each stage, scanning is performed as shown in FIGS. 5A and 5B, so that the face can be detected regardless of the image capturing angle (attitude of the digital camera).

Figure 4B:
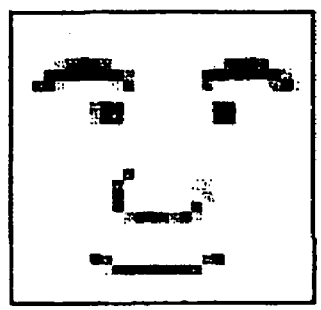
FIG. 4B shows one of the face templates to which mosaic processing is performed.
Figure 5A:
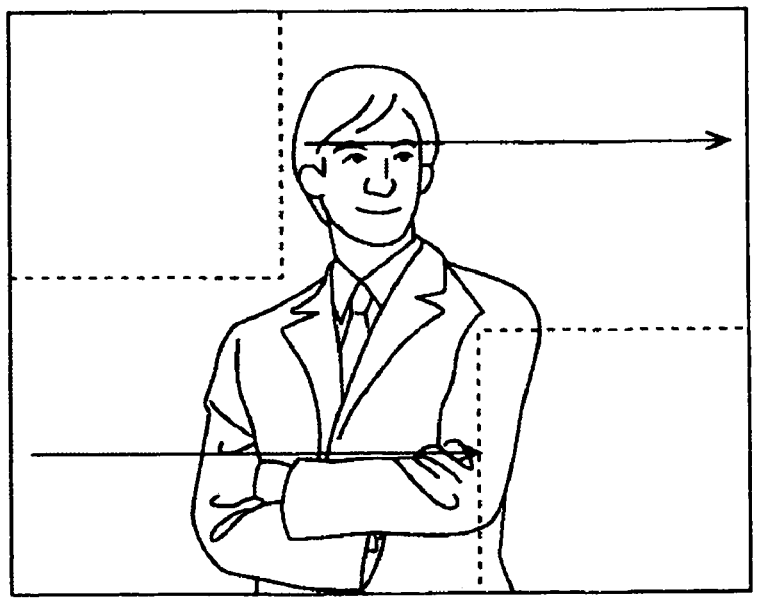
FIGS. 5A and 5B are diagrams for explaining the matching processing.
Figure 5B:
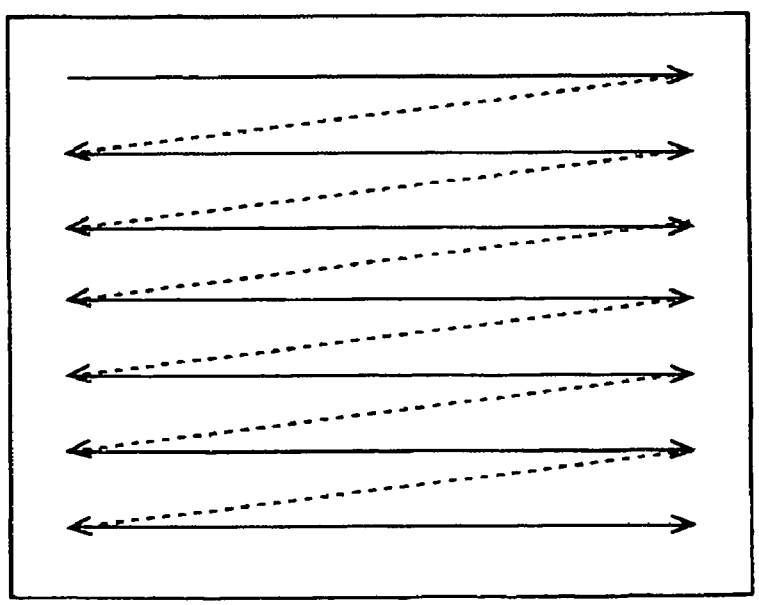
Figure 7A:
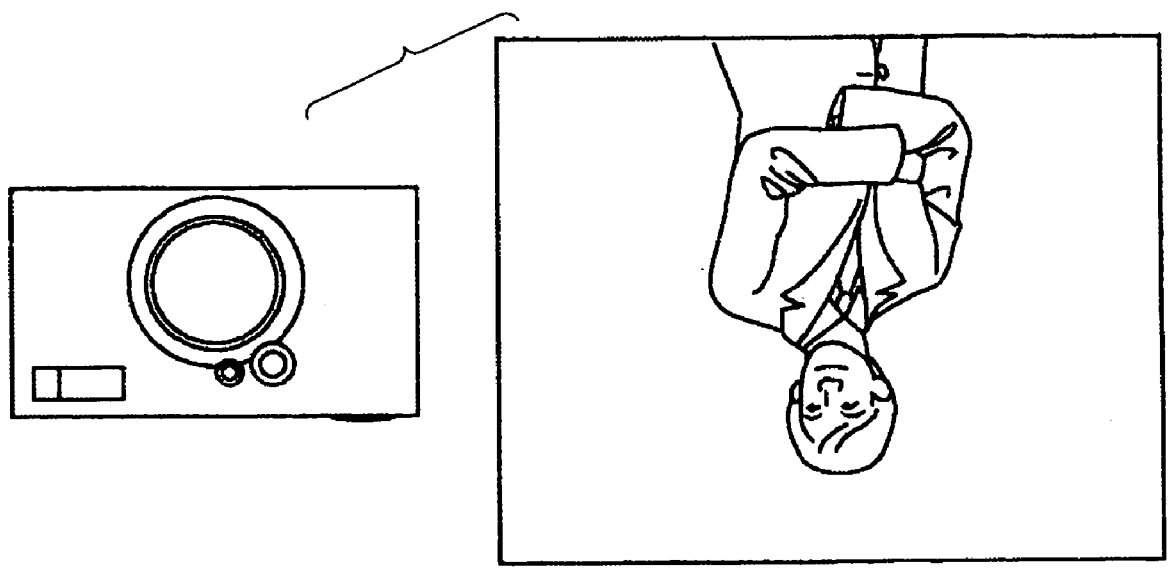
Figure 7B:
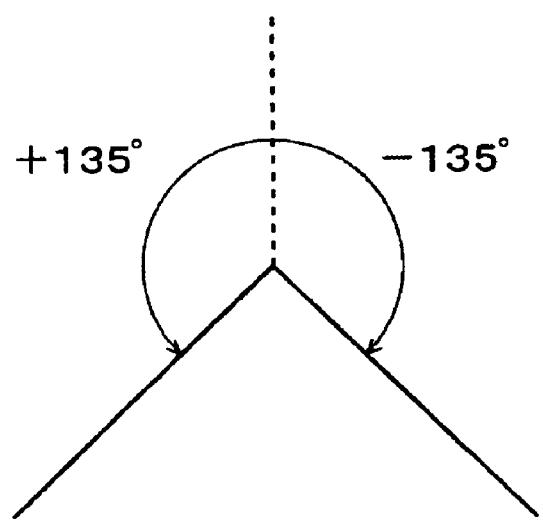
FIG. 7B is a diagram for explaining rotation of image data performed in the matching processing.

Nevertheless, the rotation of the image throughout 360 degrees and the detection using a plurality of templates as shown in FIGS. 4A and 4B cause an increase in the processing cost. Here, the situation is not expected that image capturing is performed in a state that the digital camera 30 is rotated by 180 degrees as shown in FIG. 7A. Thus, in this embodiment, such a state is excluded from the target of processing so that the processing is accelerated. Specifically, as shown in FIG. 7B, the image data is rotated stepwise (e.g., at a step of +5 degrees) in the range of +135 through −135 degrees. Then, the processing of detecting a face is performed at each stage. As a result, in the case shown in FIG. 6B, the image becomes upright when rotated by −90 degrees. Further, in the case shown in FIG. 6C, the face is detected in the upright orientation when rotated by +90 degrees. In the cases of FIG. 6B and 6C, the face is detected when rotated by −90 degrees and +90 degrees, respectively. However, by taking into consideration the cases that the captured object is tilted and that the digital camera 30 is tilted, the rotation is performed in the range of −135 through +135 degrees including a margin. As such, in this embodiment, the inverted state shown in FIG. 7A and its neighboring states are excluded from the target of processing, so that processing speed is improved.

When the processing shown in FIG. 8 is started, the following steps are executed. This processing is implemented when a program stored in the ROM 51 is read and executed in a case that printing of at least one predetermined image is instructed after a memory card M is inserted into the card slot 21.

Figures 9, 10:
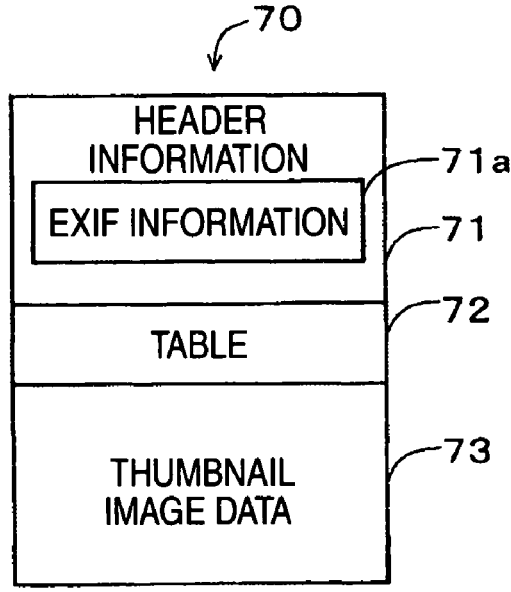
FIG. 9 is a diagram showing the configuration of an image file used in the processing of FIG. 8.
FIG. 10 shows a table used in the processing in FIG. 8.

Step S10: The CPU 50 acquires from the memory card M an image file to be printed, then executes Huffman decompression, and thereby acquires quantized DCT (Discrete Cosine Transform) coefficients. As shown in FIG. 9, the image file 70 is composed of header information 71, a table 72, and compressed data 73. Here, the header information 71 includes, for example, exif information 71a (described later in detail) as well as information such as the filename, the compression method, the image size, and the density unit. The table 72 is composed, for example, of a quantization table, an entropy coding table, and the like. The compressed data 73 is composed of image data compressed by the JPEG (Joint Photographic Coding Experts Group) method. The CPU 50 acquires the entropy coding table from the table 72 of the image file 70 shown in FIG. 9, and then decodes the DC coefficients and the AC coefficients of the Y (brightness) component, the Cr (color difference component), and the Cb (color difference component) contained in the compressed data 73 in each block. At that time, the decoding is performed on an MCU basis which is the minimum coding unit.

Step S11: The CPU 50 performs inverse quantization of the quantized DCT coefficients obtained at step S10. Specifically, the CPU 50 acquires the quantization table from the table 72 of the image file 70 shown in FIG. 9, then multiplies by the acquired values the quantized DCT coefficients obtained at step S10, and thereby obtains DCT coefficients.

Step S12: The CPU 50 caches information necessary for rotating the image, for example, into the RAM 52. Specifically, when an image compressed by the JPEG method is to be rotated, Huffman enlargement must once be performed on each of the DC component and the AC component of an MCU. Here, as for the DC component, since Huffman coding is performed on the difference between adjacent DC component values, the correlation between adjacent MCUs poses a problem. Further, as for the AC component, the data length of each MCU becomes variable owing to the Huffman coding. Thus, it becomes unclear which data piece in the bit stream of JPEG data indicates the AC component value of the MCU. This poses a problem. Thus, in the processing of step S12, the value of the DC component and the address of the AC component of each MCU is acquired and cached, so that rotating processing is allowed.

Step S13: The CPU 50 performs inverse DCT operation on the DCT coefficients obtained at step S11, and thereby acquires the original pixel values.

Step S14: The CPU 50 converts the image of the YCC color coordinates system obtained by the processing of step 813 into an image of the RGB (Red Green Blue) color coordinates system and an image of the HSB (Hue Saturation Brightness) color coordinates system.

Step S15: The CPU 50 stores and retains into the RAM 52 each of the YCC, RGB, and HSB images obtained by the processing of steps S13 and S14. At that time, the images may be stored into the RAM 52 after pixel skipping at a predetermined ratio is performed in order to reduce the amount of data.

Step S16: The CPU 50 calculates a histogram for each component of the YCC, RGB, and HSB images stored into the RAM 52 at step S15. Specifically, as for the RGB image, a histogram is calculated for each of the R, G, and B images. As a result, distribution of each component constituting the image is obtained.

Step S17: The CPU 50 determines whether the processing has been completed for all MCUs. In the case of being completed, the CPU 50 goes to step S18. Otherwise, the CPU 50 returns to step S10 and thereby repeats the same processing.

Step S18: The CPU 50 executes the processing of identifying the image orientation. When the attitude of the digital camera 30 (output data of the gyro sensor 43) at the time of image capturing is recorded in the exif information 71a of the image file 70, this information is extracted. Here, as a special case, when the top and bottom of the image data is reversed (in the state shown in FIG. 7A), the situation that the top and bottom is reversed is detected by referencing to the positional relationship of a skin color region and a black region, so that the top and bottom of the image data is reversed back. Details will be described later with reference to FIG. 11.

Step S19: The CPU 50 executes the processing of identifying a face contained in the image data. In this processing, for the purpose of determining whether a face image is contained in the image data, the image data is rotated as shown in FIG. 7B so that a region having a high correlation with the templates shown in FIGS. 4A and 4B is identified as a region (referred to as a "face region," hereinafter) where a face image is contained. Here, the size of the contained face image varies depending on the distance between the captured object and the digital camera. Further, a plurality of captured objects can be contained in some cases. Thus, the detection of a face image is performed using a plurality of templates of different sizes. Further, the processing is repeated until face regions for ten persons are found. Here, as for each identified face region, the coordinates of the center part or alternatively the coordinates of the upper left corner are stored into the RAM 52. Details will be described later with reference to FIGS. 12 and 13.

Step S20: When a face image has been identified in the processing of step S19, the CPU 50 goes to step S21. Otherwise, the CPU 50 goes to step S22.

Step S21: The CPU 50 acquires the color of face skin from the face region identified at step S19. Specifically, a predetermined pixel constituting the face region is extracted, so that each value for R, G, and B is acquired. At that time, a plurality of pixels may be extracted so that the average or the median may be calculated. Then, these values may be used. Here, when a plurality of face regions have been identified, the color of face skin is acquired from each face region. Then, for example, the median of the average is calculated.

Step S22: The CPU 50 calculates correction parameters such that the color of face skin acquired at step S21 should become a normal color of face skin. Specifically, when balance of R, G, and B deviates slightly from an appropriate value, the occurrence of color fogging is determined. Then, a correction parameter for each of R, G, and B is calculated in order to achieve correction into the normal value. Further, when the total value of R, G, and B deviates, inappropriate exposure is determined. Then, a correction parameter for each of R, G, and B is calculated in order to correct the exposure appropriately. Here, when no face has been identified at step S19, correction parameters are calculated, for example, on the basis of the color of the sky.

Here, the color of face skin depends on the individual race and the light source. Thus, referring to the table (see FIG. 10) stored in the ROM 51, appropriate correction parameters are calculated from the acquired R, G, and B. In the example of FIG. 10, the first through the third skin colors are listed. The first skin color is whitish. The second skin color is yellowish. The third skin color is blackish. In FIG. 10, for each of the first through the third skin colors, value ranges for each of R, G, and B are listed for the cases that the sunlight, a fluorescent lamp, and an incandescent lamp are used as the light source. In the processing of step S22, pixels are sampled from a plurality of points of the face region. Then, the average or the median of each of the R, G, and B values of the sampled pixels is calculated and then compared with the table shown in FIG. 10. Thus, the type of skin color of the target face and the type of light source are identified. Then, correction parameters are calculated such that the average of each of the R, G, and B values of the pixels should become the center value (appropriate value) in the table shown in FIG. 10.

Here, when a plurality of face regions have been identified, a plurality of points are sampled from each face region. Then, the average or the median of the pixels is calculated for each of a plurality of the acquired persons. Then, correction parameters are calculated on the basis of these values.

Step S23: The CPU 50 resets a file pointer indicating the position of the target of decompression in the image file to be printed, and thereby returns the processing position to the beginning of the image file.

Step S24: The CPU 50 performs Huffman decompression onto the image data of one MCU line cached in the RAM 52, and thereby obtains quantized DCT coefficients. Here, when the image is rotated, the one MCU line indicates an MCU group of one line in the vertical direction of the image. When the image is not rotated, the one MCU line indicates an MCU group of one line in the horizontal direction of the image.

Step S25: The CPU 50 performs inverse quantization of the quantized DCT coefficients obtained by the processing of step 24.

Step S26: The CPU 50 performs Inverse DCT operation on the DCT coefficients obtained at step S25, and thereby acquires the original data.

Step S27: The CPU 50 converts into an image of the RGB color coordinates system of the image of the YCC color coordinates system obtained by the processing of step S26.

Step S28: The CPU 50 performs correction processing on each pixel constituting the image of the RGB color coordinates system obtained at step S27. Specifically, the correction parameters calculated at step S22 are applied onto each pixel, so that color fogging is canceled while exposure is corrected appropriately. For example, when red is too intense owing to color fogging, for example, the processing of multiplying each pixel value by a value of "0.9" is performed such that the distribution in the histogram of R should move toward the origin.

Step S29: The CPU 50 provides the image data obtained as a result of correction processing to a band buffer (not shown) of the printer engine controller 62, and thereby causes the controller to execute print processing. In response to this, the printer engine controller 62 controls and causes the recording head 68 to eject ink corresponding to the image data, then drives the carriage motor 65 so as to move the recording head 68 in the primary scanning direction, and then drives the sheet feeding motor 63 so as to cause motion in the secondary scanning direction. As such, an image is printed.

Step S30: The CPU 50 updates the image data cached in the RAM 52, as preparation for the next processing.

Step S31: The CPU 50 determines whether the processing is to be terminated. When the processing is not to be terminated, the CPU 50 returns to step S24 and then repeats the same processing. Otherwise, the CPU 50 terminates the processing.

Figure 11:
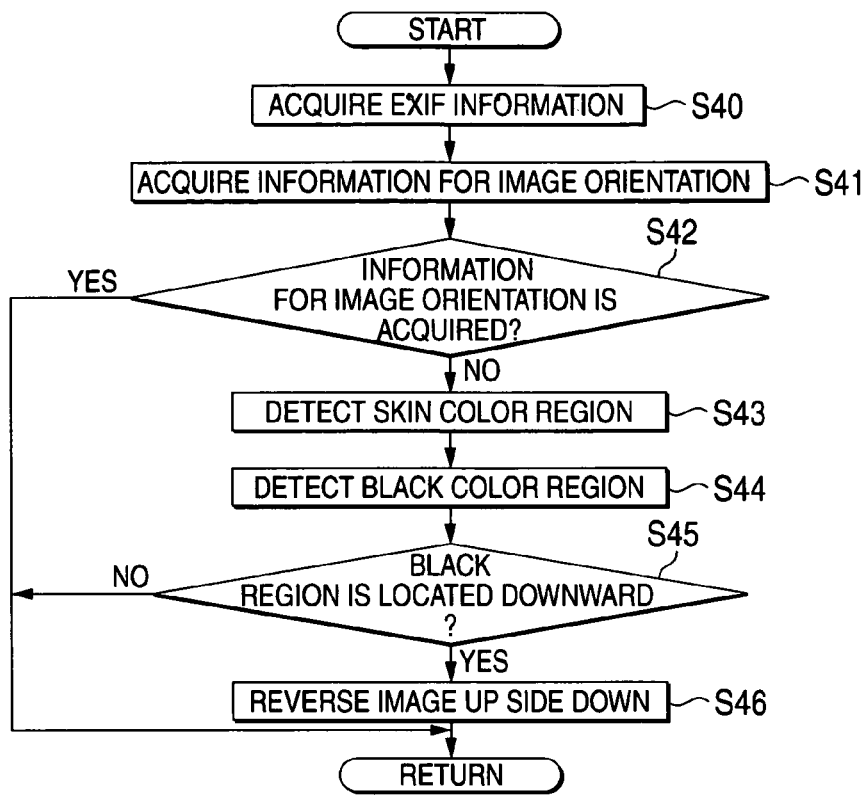
FIG. 11 is a flowchart showing processing for identifying an image orientation shown in FIG. 8.

Details of the processing of step S18 of FIG. 8 are described below with reference to FIG. 11.

Step 840: When exif information 71*a* is contained in the image file 70, the CPU 50 acquires the exif information 71*a*.

Step S41; When image orientation information is contained in the exif information 71*a*, the CPU 50 acquires the information. Here, the image orientation information is information indicating the attitude of the digital camera (e.g., an angle relative to the horizontal plane) at the time of image capturing. For example, in the case of the digital camera 30 shown in FIG. 3, data outputted from the gym sensor 43 at the time of image capturing of the image is stored into the exif information 71*a*.

Step S42: The CPU 50 determines whether image orientation information has been acquired at step S41. In the case of having been acquired, the CPU 50 returns to the original processing. Otherwise, the CPU 50 goes to step S43.

Step S43: Referring to FIG. 10, the CPU 50 detects a skin color region corresponding to a person's face in the image data.

Step S44: The CPU 50 detects black regions corresponding to the eyes and the mouth in the image data.

Step S45: On the basis of the positional relationship of the black regions and the skin color region obtained from the detection results of steps S43 and S44, when a triangle formed by joining the black regions is oriented such that one vertex is located at a top position (that is, a base line formed by joining the eyes is located downward), the CPU 50 determines that the image has been captured in a state that the top and bottom has been reversed as shown in FIG. 7A. Thus, the CPU 50 goes to step S46. Otherwise, the CPU 50 returns to the original processing.

Step S46: The CPU 50 executes the processing of reversing back the top and bottom of the image data captured in a state that the top and bottom is reversed as shown in FIG. 7A.

Details of the face matching of step S19 shown in FIG. 9 are described below with reference to FIG. 12.

Step S50: When image orientation information has been acquired at step S41, the CPU 50 goes to step S51. Otherwise, the CPU 50 goes to step S52.

Step S51: The CPU 50 executes the processing of rotating the image data by the angle indicated by the orientation information. Here, for example, an image of QVGA (Quarter Video Graphics Array) size obtained by reducing the original image by pixel skipping at a predetermined ratio is used as the image to be rotated (the image used for detecting the presence or absence of a face). Here, the kinds of image data employable as the target of processing include a Y (brightness) component image. That is, in the search whether a face region is contained in the image data, similarity is determined with the template consisted of density information. Thus, the Y component image (i.e., brightness information which is similar to the density information) is adopted as image data to be subjected to the face matching.

Step S52: The CPU 50 executes the face matching shown in FIG. 13. Details of this processing are described later.

Step S53: The CPU 50 executes the processing of rotating the image data by −135 degrees. Here, the image data to be rotated is an image of QVGA size obtained by reducing the original image by pixel skipping at a predetermined ratio, similar to the above-mentioned step S51. Further, the kind of employed image data is a Y (brightness) component image.

Step S54: The CPU 50 executes the face matching shown in FIG. 13. Details of this processing are described later.

Step S55: It is determined whether a face has been identified in the processing of step S54. In the case of being identified, the CPU 50 returns to the original processing. Otherwise, the CPU 50 goes to step S56.

Step S56: The CPU 50 executes the processing of rotating the image data by +5 degrees, then returns to step S54, and thereby repeats the same processing.

Step S57: The CPU 50 determines whether the image data has been rotated by +135 degrees. In the case of having been rotated, the CPU 50 returns to the original processing. Otherwise, the CPU 50 returns to step S54 and thereby repeats the same processing.

In the above-mentioned processing, the image data is rotated from −135 degrees to the +135 degrees at a step of 5 degrees as shown in FIG. 7B. Then, a face is identified at each angle.

Figure 12:
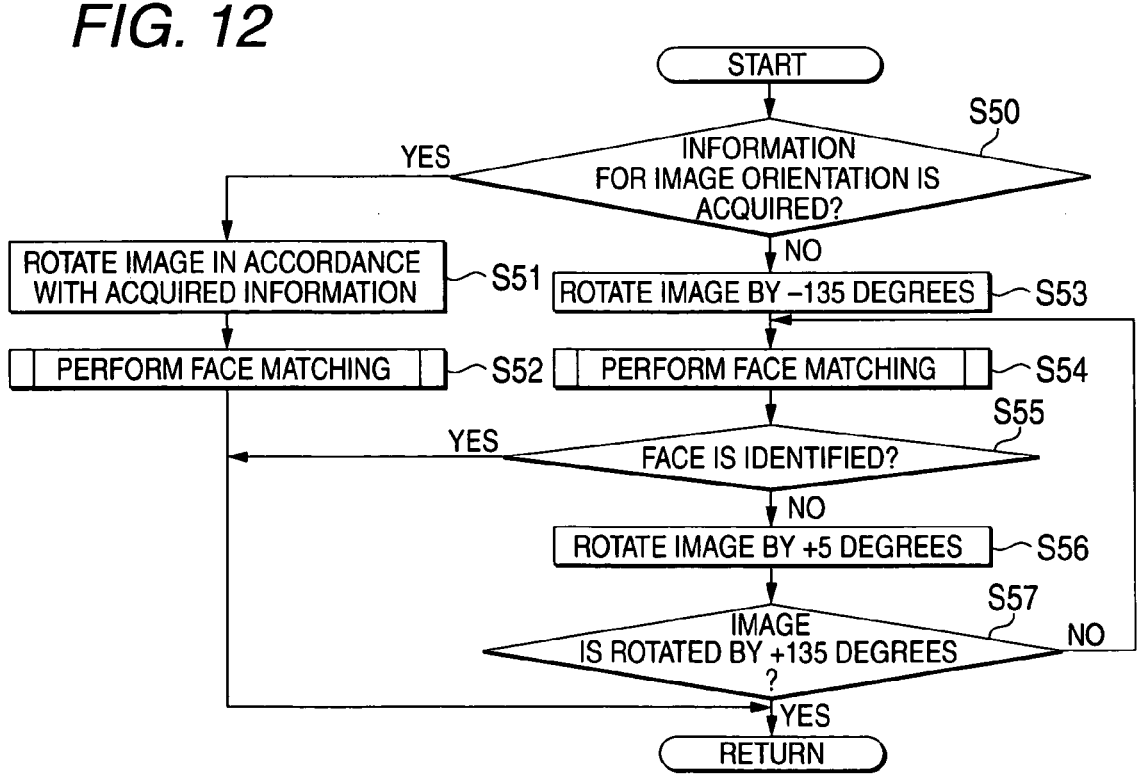
FIG. 12 is a flowchart showing processing for identifying a face in an image shown in FIG. 8.
Figure 13:
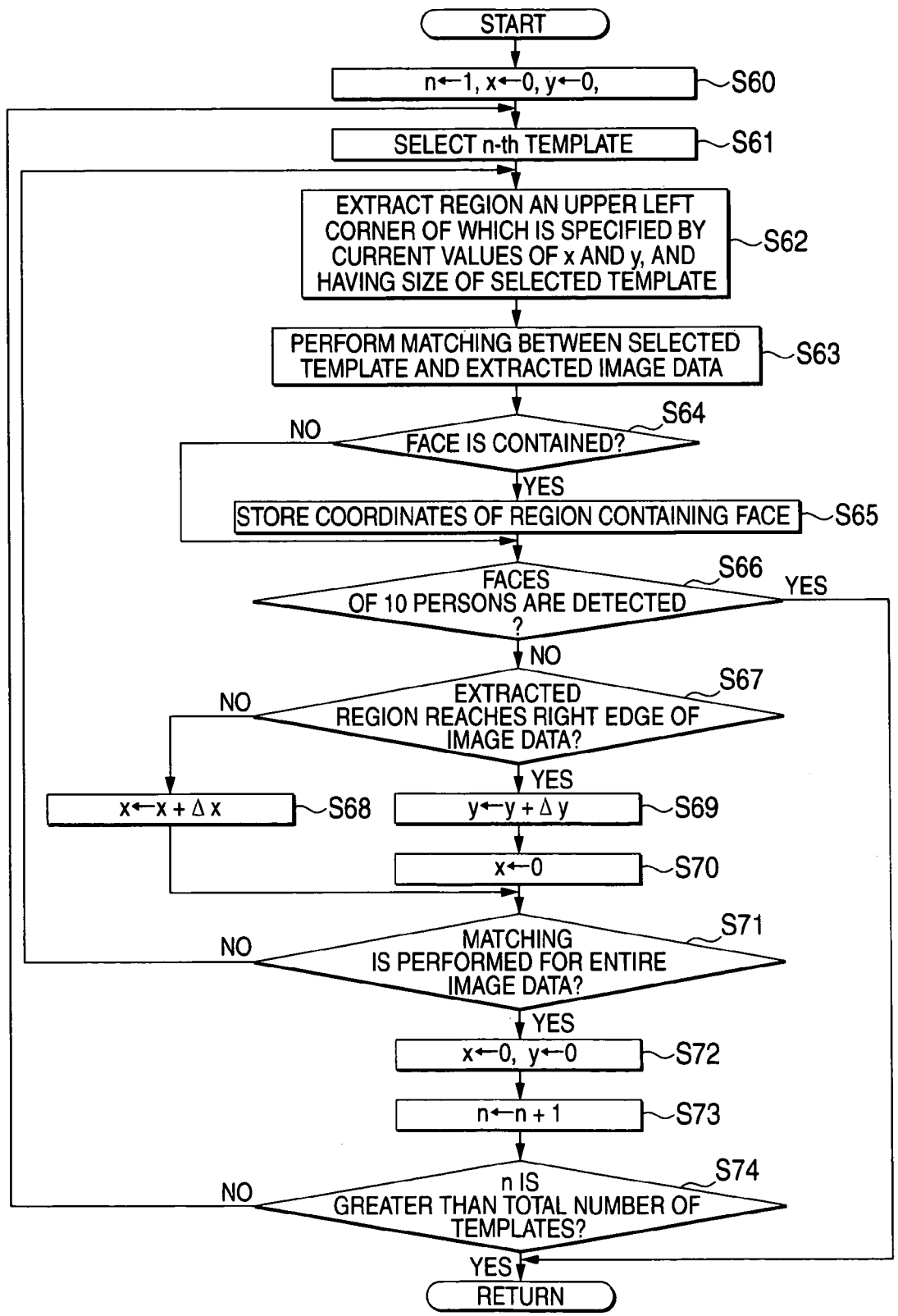
FIG. 13 is a flowchart shoving processing of face matching shown in FIG. 12.

Details of the face matching of step S52 shown in FIG. 12 are described below with reference to FIG. 13.

Step S60: The CPU 50 initializes into a value "1" a variable n for specifying a template, and then initializes into a value "0" each of variables x and y for specifying the scanning position of the template.

Step S61: The CPU 50 selects from the ROM 51 the n-th template (described later in detail) specified by the variable n. In the first processing cycle, the value '1' is set up in the variable n. Thus, the first template is selected. As shown in FIG. 4A, each template is an image containing characteristic points (such as the eyes, the nose, and the mouth) of a face. The size is decreasing in the order from the first template to the fifth template. Here, when the image of the template is at a high resolution, accuracy degrades in the matching processing owing to the features of the face of an individual person. Thus, as shown in FIG. 4B, mosaic processing is performed on the template so that the influence of the features of an individual person is suppressed.

Step S62: The CPU 50 extracts from the image data a region of a size corresponding to the template selected at step S61, by setting up x and y at the upper left corner. In the following description, the image data extracted as described here is referred to as extracted image data. In the present example, the coordinates (x,y)=(0,0), while the first template is selected. Thus, a region an upper left corner of which is specified by (x,y)=(0,0) and having the same size as the first template is extracted as extracted image data. When the image is tilted by rotation, the image data is extracted at a range that no part of the extracted image data is lost.

Step S63: The CPU 50 executes matching processing between the template selected at step S61 and the extracted image data extracted at step S62. An example of the matching method is to add up and accumulate the square of the difference between the extracted image data and the template in each pixel and then determine a high similarity (that is, a face is contained) when the accumulated value is smaller than a predetermined threshold. In place of this method, for example, a neural network may be employed. In this case, for example, a neural network of a three-layered structure is employed that includes an input layer, an intermediate layer, and an output layer. Then, learning is performed by inputting the image of the template to the input layer, for example, by shifting the position or the like. After that, the matching processing may be performed using the neural network in which sufficient learning has been performed.

Alternatively, instead of the neural network, the matching processing may be performed, for example, using a genetic algorithm. For example, as a parameter at the time of overlaying a template on the original image, the kind n of template and the x- and the y-coordinates of the upper left corner are defined. Then, the chromosome of each individual may be determined on the basis of these parameters. Then, the evolution of the group of individuals may be traced by considering the matching rate as the degree of adaptation of the individuals. Then, the optimal individual may be adopted as the final result of matching processing.

Step S64: On the basis of the result of the processing of step S63, the CPU 50 determines whether a face is contained in the extracted image data extracted at step S62. In the case of being contained, the CPU 50 goes to step S65. Otherwise, the CPU 50 goes to step S66. For example, in the case of the matching processing where the square of the above-mentioned difference is calculated, when the accumulated value is smaller than the predetermined threshold, it is determined that a face is contained.

Step S65: The CPU 50 stores into the RAM 52 the coordinates of the center of a region determined as containing a face. In the calculation of the center coordinates, the length corresponding to half the size of the presently selected template is added to each of the x- and the y-coordinates.

Step S66: The CPU 50 determines whether faces of ten persons have been detected in total in the processing until then. When faces of ten persons have been detected, the CPU 50 terminates this processing and then returns to the original processing. Otherwise, the CPU 50 goes to step S67. For example, when faces of three persons have been detected using the first template while faces of seven persons have been detected using the third template, the CPU 50 terminates this processing and then returns to the original processing.

Step S67: The CPU 50 determines whether the region from which extracted image data is to be extracted has reached the right edge of the image data. In the case of having been reached, the CPU 50 goes to step S69. Otherwise, the CPU 50 goes to step S68. That is, in this embodiment, as shown in FIG. 5A, image data of the size corresponding to the template is extracted from the image data, while this extraction is repeated in the order shown in FIG. 5B. At that time, when the region of image extraction reaches the right edge, the CPU 50 goes to step S69.

Step S68: The CPU 50 adds $\Delta x$ to the x-coordinate of the upper left corner. Here, $\Delta x$ is determined into an optimal value depending on the size of the selected template. For example, when the size of the template is small, the value of $\Delta x$ is set small. When the size is large, the value of $\Delta x$ is increased.

Step S69: The CPU 50 adds $\Delta y$ to the y-coordinate of the upper left corner. Here, $\Delta y$ is determined depending on the size of the template similar to the above-mentioned case of $\Delta x$.

Step S70: The CPU 50 sets up the x-coordinate of the upper left corner to be "0." As a result, the region of image extraction returns to the left edge of the image.

Step S71: The CPU 50 determines whether the processing has been completed for the entire region by using a predetermined template. In the case of being completed the CPU 50 goes to step S72. Otherwise, the CPU 50 returns to step S62 and thereby repeats the same processing.

Step S72: The CPU 50 sets up a value "0" into each of x and y. As a result, the region of image extraction is reset into the upper left corner of the image data.

Step S73: The CPU 50 increments by "1" the variable n for selecting a template. In the present example, since a value "1" had been set up in the variable n, the value of the variable n becomes "2" after this processing. As a result, the second template is selected in the processing of step S61.

Step S74: The CPU 50 determines whether the value of the variable n is greater than the total number N of templates. In the case of being greater, the CPU 50 terminates the processing. In the present example, N=5 as shown in FIG. 4. Thus, when n>5, the CPU 50 terminates this processing and then returns to the original processing. Otherwise, the CPU 50 returns to step S61 and thereby repeats the same processing.

As described above, according to this embodiment, when determining whether a face region is contained is performed by rotating the image data, the top-and-bottom inverted angle and its adjacent angles are excluded from the target of processing, so that processing speed is improved.

Figure 14:
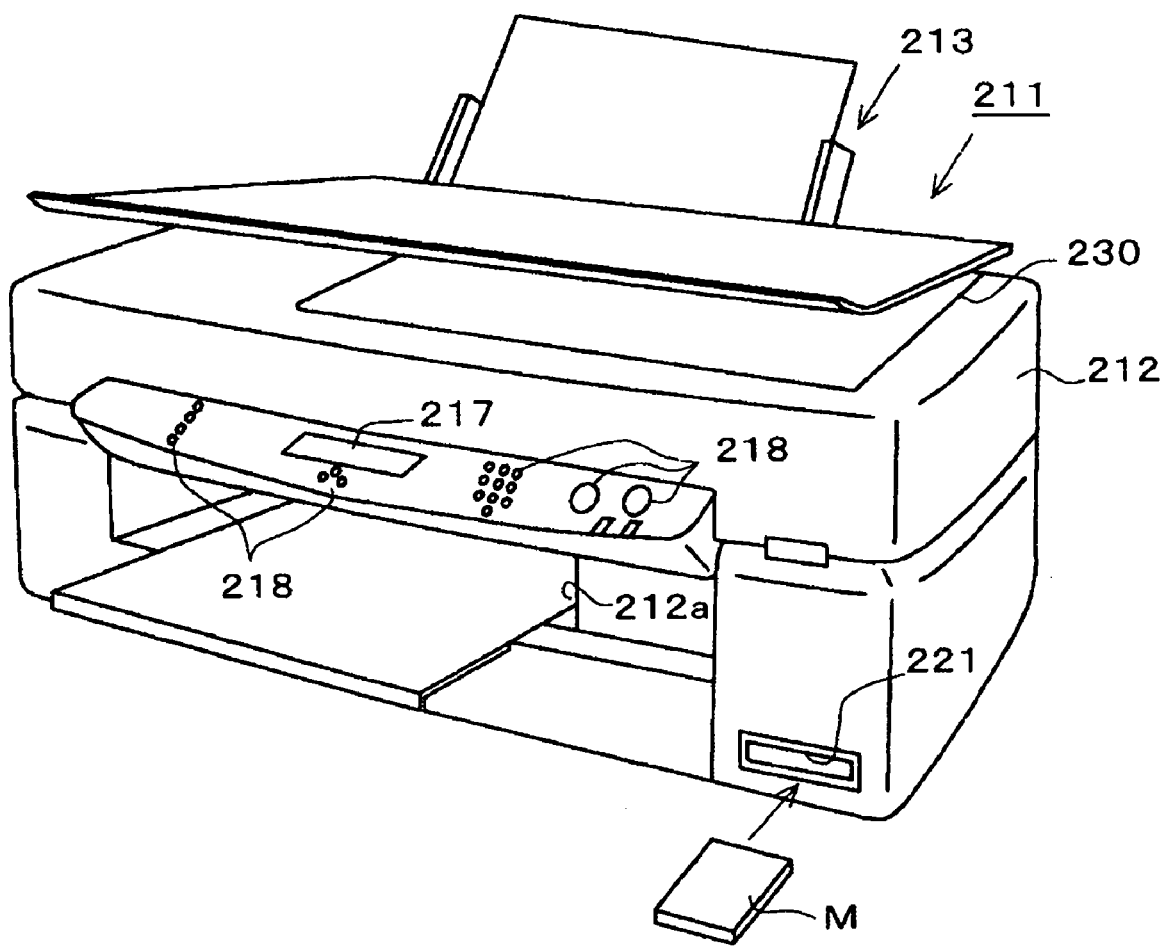
FIG. 14 is a perspective view of a printing apparatus according to a second embodiment of the invention.

The first embodiment has been described by adopting a stand-alone type printing apparatus as an example. However, the present invention is applicable also to an ordinary printing apparatus (a printing apparatus of a type used in a state connected to a personal computer). Further, the present invention is applicable also to a so-called hybrid type printing apparatus in which a scanner apparatus, a printing apparatus, and a copying apparatus are integrated as shown in FIG. 14. Such a hybrid type printing apparatus will be described as a second embodiment of the invention. Components similar to those in the first embodiment will be designated by the same reference numerals and repetitive explanations for those will be omitted.

Figure 15:
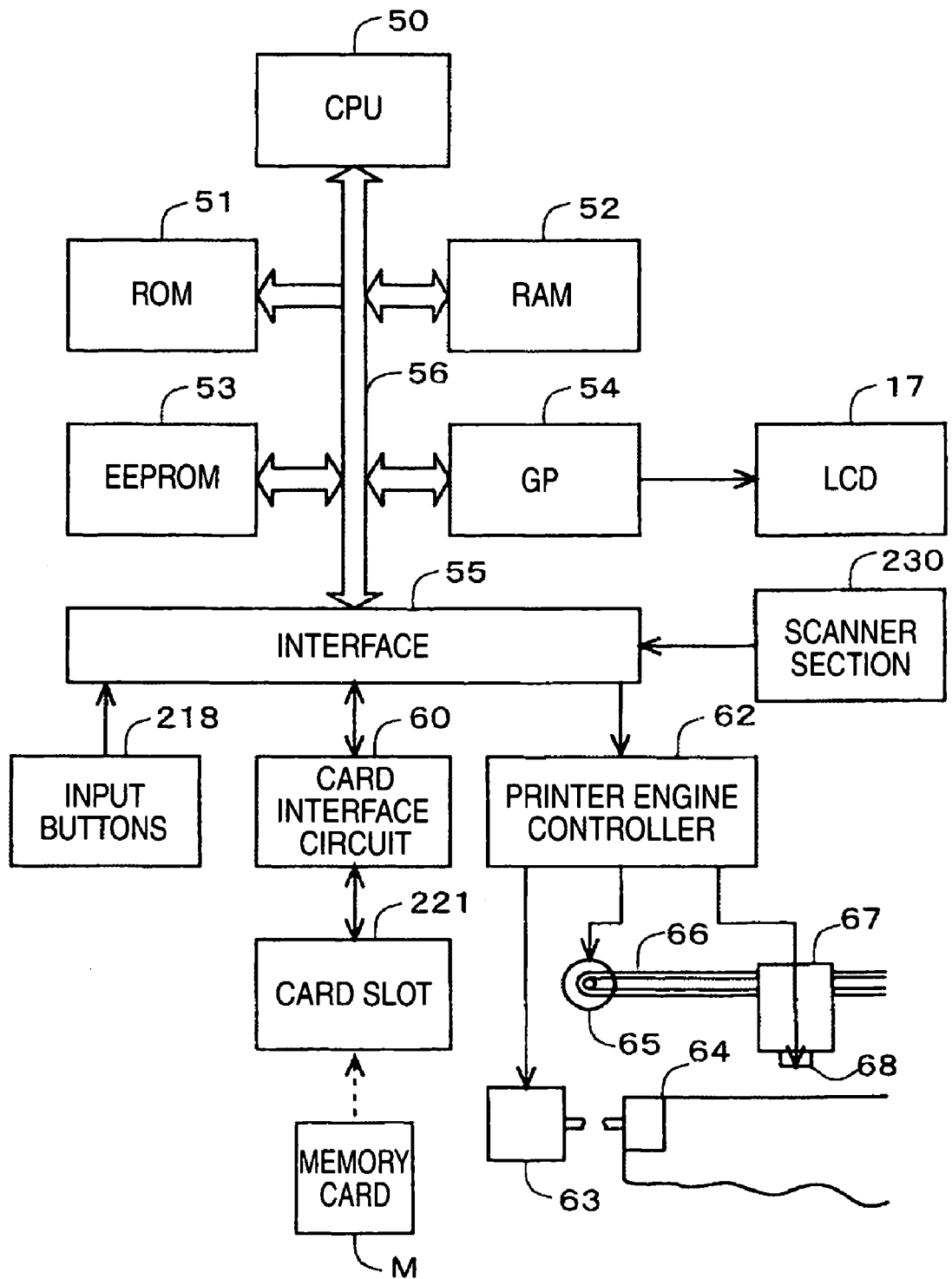
FIG. 15 is a block diagram showing a control system of the printing apparatus of FIG. 14.

As shown in FIGS. 14 and 15, a hybrid type printing apparatus 211 is equipped with: a casing 212; a sheet feeding unit 213 for feeding a cut sheet; a scanner section 230 for reading an image printed on a sheet medium or the like; and a printing section (not shown) for performing printing onto the cut sheet.

The box-shaped casing 212 has the scanner section 230 at the upper part thereof. An LCD 217 and input buttons 218 for various kinds of operations are provided at a center part of the front face. Similar to the casing 12 of the first embodiment, the LCD 217 displays the menu function, the contents of operation, the status of operation, the contents of error, and the like of the printing apparatus 211. The input button 218 is pushed when menu selection or the like is performed in the printing apparatus 211.

The casing 212 has an ejection port 212a at a lower part of the front face, so that a printed cut sheet is ejected through this port. Further, a card slot 221 is provided at a front right side of the casing 212, while, for example, a memory card M for storing image data captured by a digital camera or the like is accommodated in this slot in a freely removable manner.

The sheet feeding unit 213 is provided at the rear side of the casing 212, and stocks cut sheets so as to feed one sheet at a time into the printing apparatus 211 in a case of being necessary.

The input buttons 218 include buttons for controlling the scanner function and the copying function. The scanner section 230 is composed of an optical system and an imaging system for reading an image printed on a sheet medium; and a controller for controlling these systems. Then, under the control of the CPU 50, the scanner section 230 reads the image printed on the sheet medium, then converts the image into corresponding image data, and then outputs the data.

In this hybrid type printing apparatus 211, when the above-mentioned processing is performed on image data read from the memory card M or alternatively image data read from the digital camera, correction can be performed in accordance with the face contained in the image.

In this embodiment, the correction processing can be performed in accordance with the face contained not only in an image read in from the memory card M, but also in that read in by the scanner section 230. Nevertheless, in this case, the orientation of placing an original image is not limited. Thus, for example, the image data could be read in a state that the top and bottom is reversed as shown in FIG. 7A. Thus, the face detection for the image data read in from the memory card M may be performed by rotating the image in the range of −135 through +135 degrees as described above. In contrast, the face detection for the image data read in from the scanner section 230 may be performed by rotating the image throughout 360 degrees including the state that the top and bottom is reversed.

In the above embodiments, the image data to be processed is rotated in the range of −135 through +135 degrees. However, another angle range may be employed. For example, the range of −120 through +120 degrees may be employed. In short, any angle range may be employed as long as the range includes the range of −90 through +90 degrees plus a certain amount of margin.

In the above embodiments, the range where the image is to be rotated is fixed. However, the habit of the image capturing person may be learned so that the range may be set up appropriately. For example, when the angles of FIGS. 6A and 6B are used most frequently whereas the angles of FIGS. 6C and 7A are not used, for example, the rotation may be performed in the range of −135 through +45 degrees. Alternatively, when a narrow range of camera inclination is used owing to the habit of the image capturing person, an appropriate range of rotation (e.g., the range of −100 through +100 degrees) in place of the range of −135 through +135 degrees may be adopted on the basis of learning.

In the above embodiments, the image data itself is rotated. However, the image data may be fixed while the template may be rotated. In this case, since the data amount is less in the template, the amount of processing necessary for the rotation is reduced, and thereby improves processing speed. Further, even when the image data is rotated, the entire image data need not be rotated. That is, a part of data may be extracted from the image data, so that the extracted image data may solely be rotated. In this case, when a range slightly larger than the template (a range that surrounds the rotated template) is extracted, the face detection processing can be executed normally, and still the amount of processing of data necessary for the rotation is reduced.

In the above embodiments, the face region is identified by increasing the rotation angle of the image data at a step of +5 degrees. However, the face region may be identified with increasing the rotation angle at a step of another value (e.g., +2 degrees) or alternatively with reducing the rotation angle. Further, the angle increment need not be fixed. That is, the angle increment may be reduced (e.g., +3 degrees) for angle ranges having high probability of presence of a face region (e.g., 0 degree, +90 degrees, −90 degrees, and their adjacent angle ranges). In contrast, the angle increment may be increased (e.g., +10 degrees) for the other angle ranges.

In the above embodiments, templates corresponding to a face directed frontward is employed. However, for example, templates corresponding to faces directed upward, downward, rightward, and leftward may be employed. In this case, a plurality of templates of intermediate states between the frontward face and the upward, downward, rightward, and leftward faces may be prepared so that matching processing may be executed with each template. In this case, even when the captured person is directed in a direction other than the frontward direction, the probability that the face is appropriately recognized is improved.

In the above embodiments, the entire range of the image data is subjected to the detection processing. However, for example, learning concerning a range having a high possibility of the presence of a person's face may be performed on the basis of the habit of the image capturing person. Then, a range including the high possibility range may be extracted so that the above-mentioned processing may be performed. This method allows a face to be found at minimum cost.

In the above embodiments, mosaic processing is performed on the template. However, mosaic processing may also be performed on the image data.

In the above embodiments, face detection is performed using the Y image of the image of the YCC color coordinates system. However, for example, a monochrome grayscale image may be generated from the image of the RGB color coordinates system. Then, face detection may be performed using the monochrome image.

In the above embodiments, the processing is terminated at the time that ten persons have been detected regardless of the size of their faces. However, for example, a small face can be considered as having low importance. Then, the processing may be terminated when a predetermined number of large faces have been found out. This configuration improves processing speed. Further, a number may be set up for each face size. Then, the processing may be terminated when the predetermined number of faces have been detected, for example, one face with the first template and two faces with the second template. In this case, when a large face considered as a main captured object is detected, the processing can be terminated rapidly. This reduces the processing time.

In the above embodiments, face detection is performed in the order shown in FIG. 5B. However, for example, the detection may be started at the screen center having a highest probability of containing a face, and then may be performed in a spiral manner toward the outer sides. At that time, the movement step for the extraction region may be set small in the center part of the screen, while the movement step may be increased gradually for outer sides. In this case, the detection processing can be executed at step sizes in accordance with the probability of the presence of a face. Further, when this modification is implemented together with the abovementioned modification that the processing is terminated when large faces have been found, processing speed can be improved.

Next, a third embodiment of the invention will be described. Components similar to those in the first embodiment will be designated by the similar reference numerals and repetitive explanations for those will be omitted.

Figure 16:
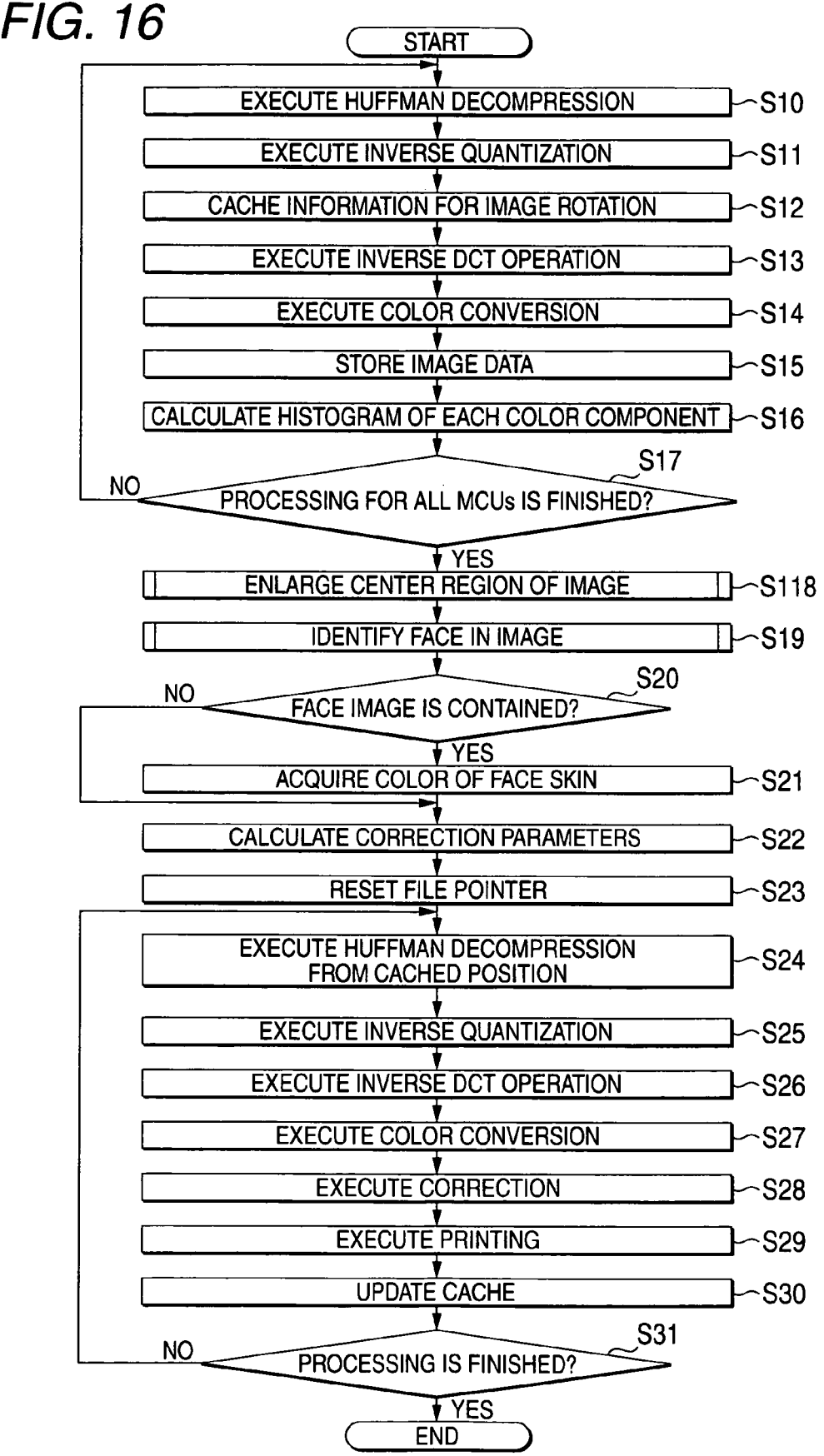
FIG. 16 is a flowchart showing processing performed in a printing apparatus according to a third embodiment of the invention.

In this embodiment, as shown in FIG. 16, at step S118, the CPU 60 executes the processing of enlarging of the center part of the image obtained by the processing of step S13. When the main captured object is a person, a person's image is located at the center part of the image in many cases. Further, when a person's image is located at a position other than the center part, the person is not a main captured object in many cases. Thus, when the center part is extracted from the image, the data amount is reduced so that processing speed is improved. Further, when the enlarging processing is performed, the portions such as the eyes and the mouth serving as the targets of face identification of step S19 are enlarged. Further, by virtue of the enlargement, the pixel values are averaged out so that noise components are reduced. This improves accuracy in the face identification.

Figure 17:
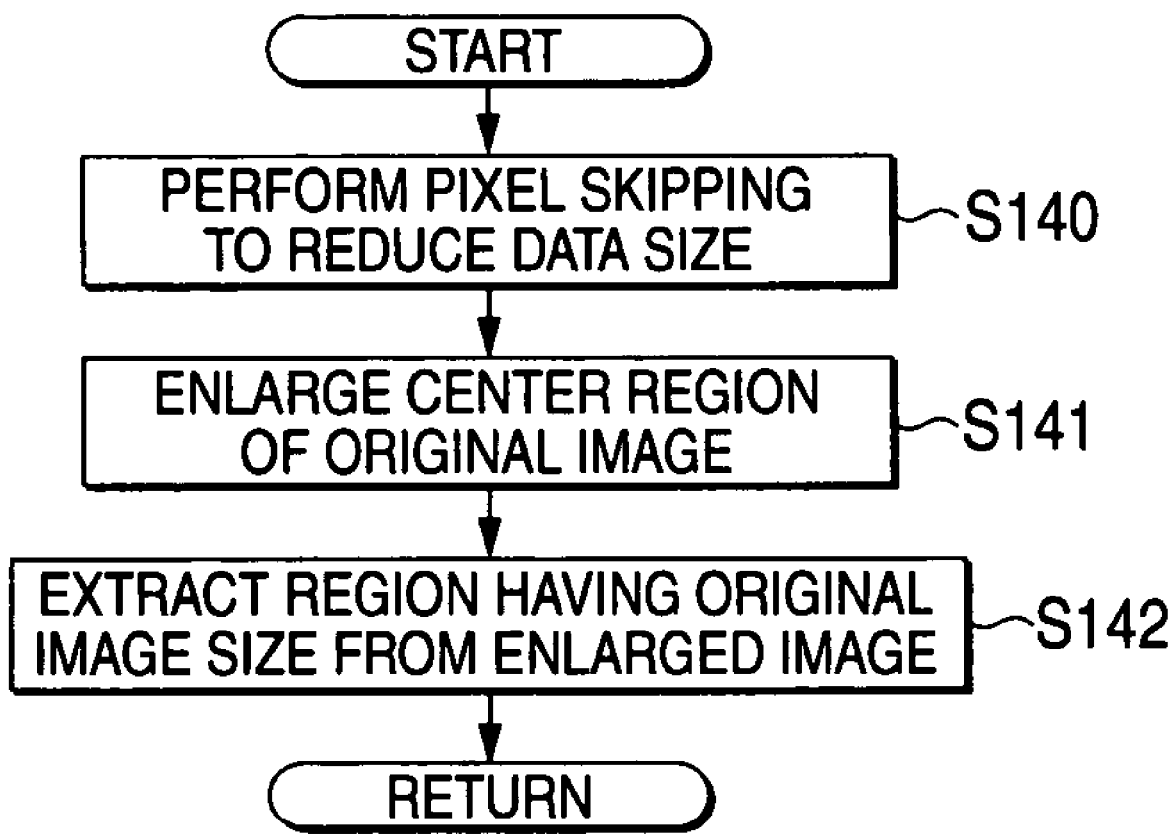
FIG. 17 is a flowchart showing image enlargement processing shown in FIG. 16.

Details of the processing of step S118 of FIG. 16 will be described below with reference to FIG. 17.

Step S140: Using the processing of step S15, the CPU 50 executes the processing of size reduction of the image data retained in the RAM 52, by pixel skipping at a predetermined ratio. Here, for example, an image of QVGA (Quarter Video Graphics Array) size obtained by reducing the original image by pixel skipping at a predetermined ratio is used as the image to be rotated (the image used for detecting the presence or absence of a face). Here, the kinds of image data employable as the target of processing include a Y (brightness) component image. That is, in the search whether a face region is contained in the image data, similarity is determined with the template consisted of density information. Thus, the Y component image (i.e., brightness information which is similar to the density information) is adopted as image data to be subjected to the face matching.

Figure 18A:
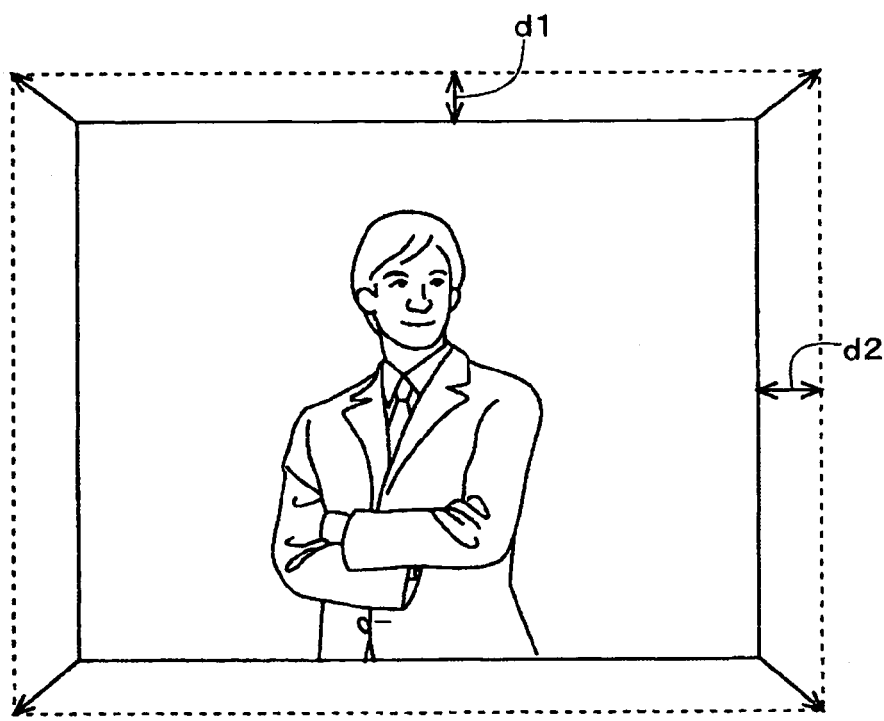
FIGS. 18A and 18B are diagrams for explaining the image enlargement processing.

Step S141: The CPU 50 executes the processing of enlarging into a predetermined size the image data obtained by the pixel skipping at step S140. For example, as shown in FIG. 18A, the image data indicated by a solid line is enlarged into a region indicated by a dashed line which is larger than the original image by d1 pixels (e.g., 10 pixels) in the up and down directions and d2 pixels (e.g., 10 pixels) in the right and left directions. Here, employable methods of enlarging processing include nearest neighbor interpolation, bilinear interpolation, bicubic interpolation, and linear interpolation.

Figure 18B:
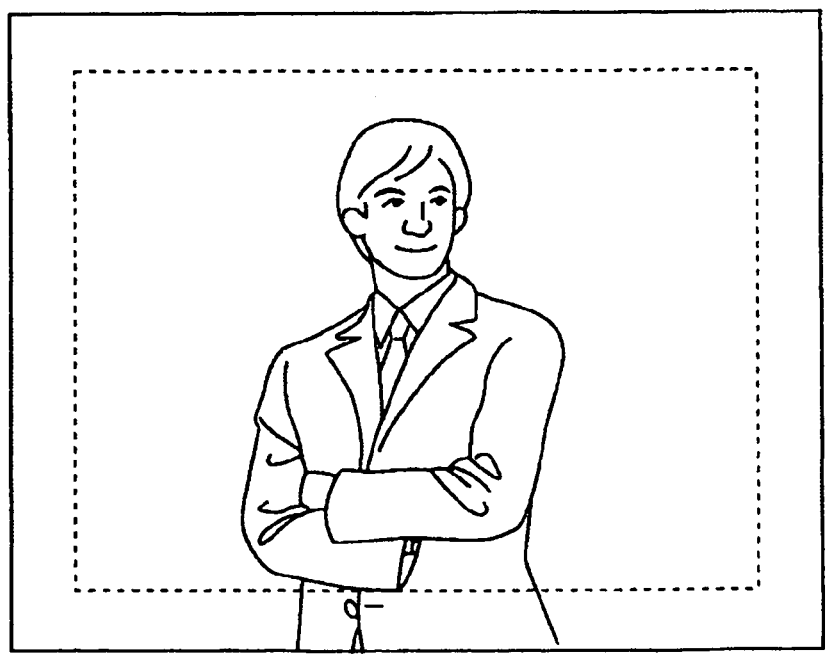

Step S142: The CPU 50 executes the processing of extracting image data of the original size from the image data enlarged at step S141, and then returns to the original processing. For example, as shown in FIG. 18B, image data of the original size is extracted from the image data enlarged at step S141.

Figure 19A:
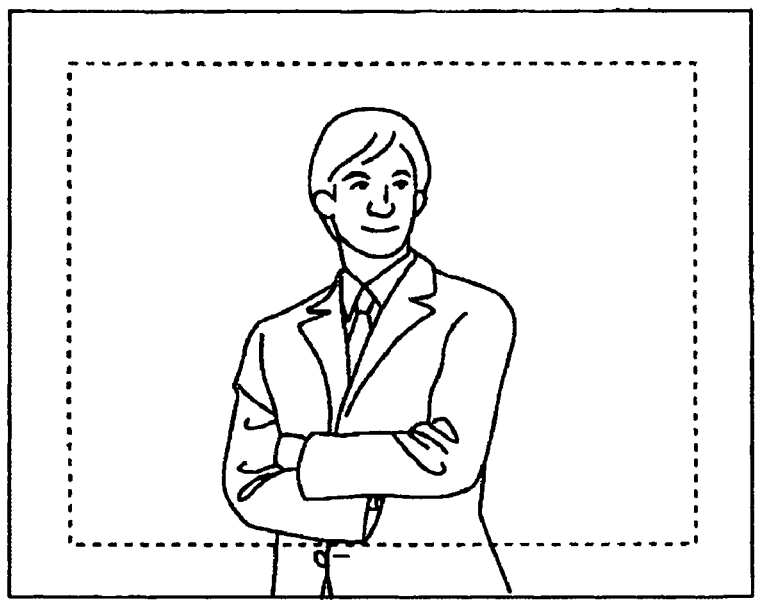
FIGS. 19A and 19B are diagrams for explaining a modified example of the image enlargement processing.
Figure 19B:
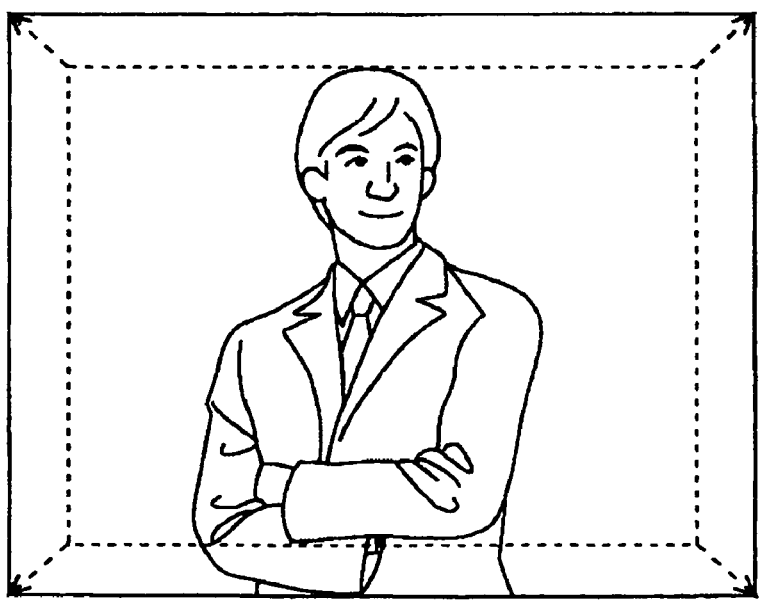

In this embodiment, a region in the center part is extracted after the enlargement of the image. However, after the extraction of a region in the center part of the image, the extracted region may be enlarged. For example, after a region indicated by a dashed line is extracted from the image as shown in FIG. 19A, the extracted region is enlarged as shown in FIG. 19B. In this case, the area of a region subjected to the enlargement processing that requires a processing cost can be reduced. This improves processing speed in comparison with the case of FIGS. 18A and 18B.

With the above configurations, a region in the center part of the image data is extracted, and then the presence or absence of a face is determined. Thus, image data subjected to the processing is narrowed down. This improves processing speed. Further, a captured person is located near the center of the image in many cases. Furthermore, a person located at a position other than the center is not the main captured object in many cases. This permits efficient narrowing down of the possibility of the target of processing.

Further, the target image is enlarged after the reduction by pixel skipping. Thus, noise contained in the image is removed, so that accuracy is improved in the face matching. Further, since the original image is enlarged, elements such as the eyes, the mouth, and the nose serving as characteristic parts can easily be found out.

In a case where the above processing is performed in the printing apparatus 210 shown in FIGS. 14 and 15, the correction processing can be performed in accordance with the face contained not only in an image read in from the memory card M, but also in that read in by the scanner section 230. That is, for example, when a photograph or the like is placed and scanned on the scanner section 230, the image is read in and converted into image data. Then, when processing similar to that of the above-mentioned case is performed on the image data, correction processing can be executed in accordance with the color of face skin of a person.

In this embodiment, the region from which image-data is extracted is fixed. However, learning may be performed on the basis of the past processing so that an optimal range may be set up. Specifically, a portion having a high probability of the presence of a face in the image data may be identified on the basis of the past data. Then, the region may be set up such that the portion should be included. This method allows a face to be found at minimum cost.

In this embodiment, a region to be extracted in the center part is set up in an approximately rectangular shape. However, a region of another shape may be extracted. For example, the shape may be a trapezoid, a triangle, or a circle.

In this embodiment, a region in the center part is enlarged or reduced. However, recognition processing may be performed without enlargement or reduction by using the intact image of the extracted region. Further, reduction and enlargement may be repeated several times so that noise components may be reduced. This improves recognition accuracy. Further, the processing of detecting whether a face is contained may be performed after mosaic processing is performed on the extracted image.

In this embodiment, linear interpolation is employed as the method of enlarging the extracted image data. However, another processing method may be employed in the enlargement processing. Employable methods include the nearest neighbor method in which the color of an image constituting point located at the nearest position from the interpolation point is adopted intact as the color of the interpolation point, the bilinear method in which the weighted average of the color values of the four image constituting points surrounding the interpolation point is adopted as the color of the interpolation point, and the bicubic method in which the result of interpolation by the cubic spline method concerning the 4×4=16 image constituting points surrounding the interpolation point is adopted as the color of the interpolation point.

In the above embodiments, the processing shown in FIGS. 8, 11-13, 16 and 17 are executed by the printing apparatus 11 or the printing apparatus 211. However, for example, the processing may be executed by a host computer connected to the printing apparatus 11 or the printing apparatus 211.

The processing can be executed by a computer. In this case, a program is provided to describe the content of a processing that the printing apparatus executes. A computer executes the program whereby the processing is performed in the computer. The program, which describes the content of the processing, can be recorded in a recording medium, which can be read by a computer. A recording medium, which can be read by a computer, includes a magnetic recording system, an optical disk, a magneto-optical recording medium, a semiconductor memory, etc. The magnetic recording system includes a hard disk drive (HDD), a floppy disk (FD), a magnetic tape, etc. The optical disk includes a DVD, a DVD-RAM, a CD-ROM, a CD-R/RW (Rewritable), etc. The magneto-optical recording medium includes an MO (magneto-Optical disk), etc.

In case of distribution of programs, portable recording media, such as DVD, CD-ROM, etc., with the programs recorded are sold. Also, programs are stored in a storage device of a server computer, and the programs can be transferred to other computers from the server computer.

A computer that executes programs stores in its own storage device programs recorded in a portable recording medium, or programs transferred from the server computer. The computer reads the programs from its own storage device to execute a processing according to the programs. In addition, the computer can read the programs directly from a portable recording medium to execute a processing according to the programs. Also, the computer can also execute a processing sequentially according to the received programs each time a program is transferred from the server computer.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A method of processing image data comprising:
   rotating at least one of a template and the image data to adjust a relative angle between an original orientation of the template and an original orientation of the image data to exclude an angle range including 180 degrees, the template being previously provided in a storage and used in detecting a human face;
   examining a matching between a part of the image data and the template to identify a region in the image data containing an image of the human face;
   correcting the image data in accordance with a condition of the image of the human face;
   detecting angle information contained in the image data and indicative of an orientation of an image capturing device when an image in the image data is captured; and
   determining the relative angle based on the angle information,
   wherein at least one of rotating, examining, and correcting is performed by an image processor.

2. A method of processing image data comprising:
   rotating at least one of a template and the image data to adjust a relative angle between an original orientation of the template and an original orientation of the image data to exclude an angle range including 180 degrees, the template being previously provided in a storage and used in detecting a human face;
   examining a matching between a part of the image data and the template to identify a region in the image data containing an image of the human face; and
   correcting the image data in accordance with a condition of the image of the human face,
   wherein the relative angle is determined in accordance with a positional relationship between a skin color region and a black color region which are contained in the image data, and
   at least one of rotating, examining, and correcting is performed by an image processor.

3. A recording medium having a computer program recorded thereon, which computer program, when executed by a computer, causes the computer to execute the method as set forth in claim 1.

4. An image processor, adapted to process image data, comprising:
   a storage, which, in advance, stores a template being used in detecting a human face;
   a rotator, operable to rotate at least one of the template and the image data to adjust a relative angle between an original orientation of the template and an original orientation of the image data to exclude an angle range including 180 degrees;
   a matching executer, operable to examine a matching between a part of the image data and the template to identify a region in the image data containing an image of a human face;
   a corrector, operable to correct the image data in accordance with a condition of the image of the human face;
   a detector, operable to detect angle information contained in the image data and indicative of an orientation of an image capturing device when an image in the image data is captured; and
   a determining executer, operable to determine the relative angle based on the angle information.

5. A printing apparatus comprising:
   the image processor as set forth in claim 4; and
   a printing head, operable to print the corrected image data on a printing medium.

6. A recording medium having a computer program recorded thereon, which computer program, when executed by a computer, causes the computer to execute the method as set forth in claim 2.

7. An image processor, adapted to process image data, comprising:
   a storage, which, in advance, stores a template being used in detecting a human face;
   a rotator, operable to rotate at least one of the template and the image data to adjust a relative angle between an original orientation of the template and an original orientation of the image data to exclude an angle range including 180 degrees;
   a matching executer, operable to examine a matching between a part of the image data and the template to identify a region in the image data containing an image of a human face; and
   a corrector, operable to correct the image data in accordance with a condition of the image of the human face,
   wherein the relative angle is determined in accordance with a positional relationship between a skin color region and a black color region which are contained in the image data.

8. A printing apparatus comprising:
   the image processor as set forth in claim 7; and
   a printing head, operable to print the corrected image data on a printing medium.

* * * * *